US 12,307,076 B2

(12) United States Patent
Han et al.

(10) Patent No.: US 12,307,076 B2
(45) Date of Patent: May 20, 2025

(54) IMAGE DELETION OPERATION NOTIFICATION METHOD, DEVICE, AND STORAGE MEDIUM

(71) Applicant: Honor Device Co., Ltd., Shenzhen (CN)

(72) Inventors: Xiao Han, Shenzhen (CN); Kai Qian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/273,273

(22) PCT Filed: Dec. 26, 2022

(86) PCT No.: PCT/CN2022/142071
§ 371 (c)(1),
(2) Date: Jul. 20, 2023

(87) PCT Pub. No.: WO2023/160208
PCT Pub. Date: Aug. 31, 2023

(65) Prior Publication Data
US 2024/0402887 A1 Dec. 5, 2024

(30) Foreign Application Priority Data
Feb. 28, 2022 (CN) .................. 202210188074.7

(51) Int. Cl.
*G06F 3/048* (2013.01)
*G06F 3/04817* (2022.01)
(Continued)

(52) U.S. Cl.
CPC ........ *G06F 3/0484* (2013.01); *G06F 3/04817* (2013.01); *G06F 21/629* (2013.01)

(58) Field of Classification Search
CPC ... G06F 3/0484; G06F 3/04817; G06F 21/629
See application file for complete search history.

(56) References Cited

U.S. PATENT DOCUMENTS

| 10,936,187 B2 | 3/2021 | Ikuta |
| 11,868,314 B2 | 1/2024 | Li et al. |

(Continued)

FOREIGN PATENT DOCUMENTS

| CN | 103578515 A | * | 2/2014 | ........... G11B 27/034 |
| CN | 105611103 A | * | 5/2016 | ........... G06F 3/0482 |

(Continued)

OTHER PUBLICATIONS

Leom et al., Forensic Collection and Analysis of Thumbnails in Android, 2015, IEEE, 8 pages. (Year: 2015).*

(Continued)

*Primary Examiner* — Linh K Pham
(74) *Attorney, Agent, or Firm* — Leydig, Voit & Mayer, Ltd.

(57) ABSTRACT

An image deletion operation notification method, a device, and a storage medium, where the method includes: displaying an image deletion prompt after detecting that a first application deletes an image, the image deletion prompt including a name of the first application, the first application being a third-party application; and displaying a first interface of a gallery application in response to an operation of opening the gallery application by a user, the first interface including an image deletion card, the image deletion card including the name of the first application, and the first interface being not a full-size image interface for displaying an original image. In the solution, the electronic device notifies the user that an image is deleted by the application, so that the user can find, in a timely manner, an operation of deleting the image by the third-party application and restore the deleted image.

20 Claims, 34 Drawing Sheets

(51) Int. Cl.
*G06F 3/0484* (2022.01)
*G06F 21/62* (2013.01)

(56) References Cited

U.S. PATENT DOCUMENTS

| | | | | |
|---|---|---|---|---|
| 2008/0052945 | A1* | 3/2008 | Matas | H04N 1/00411 34/173 |
| 2008/0281776 | A1* | 11/2008 | Goradia | G09B 5/02 |
| 2010/0074590 | A1* | 3/2010 | Momosaki | G11B 27/034 386/278 |
| 2015/0172440 | A1* | 6/2015 | Cho | G06F 3/04886 455/412.2 |
| 2016/0124620 | A1* | 5/2016 | Bao | G06F 3/0488 715/808 |
| 2018/0120891 | A1* | 5/2018 | Eim | H04M 1/0235 |
| 2019/0215452 | A1* | 7/2019 | Chen | H04N 5/772 |

FOREIGN PATENT DOCUMENTS

| | | | | |
|---|---|---|---|---|
| CN | 107622112 | A | 1/2018 | |
| CN | 108549576 | A * | 9/2018 | |
| CN | 108549698 | A * | 9/2018 | |
| CN | 108737655 | A * | 11/2018 | ........ H04M 1/72555 |
| CN | 108762983 | A * | 11/2018 | .......... G06F 11/1448 |
| CN | 106257405 | B * | 12/2019 | ............. G06F 3/121 |
| CN | 111564386 | A * | 8/2020 | ........ G05B 19/4147 |
| CN | 111699466 | A | 9/2020 | |
| CN | 107622203 | B | 12/2020 | |
| CN | 112003980 | B * | 7/2022 | |
| EP | 3627326 | A1 | 3/2020 | |
| WO | WO-2016124620 | A1 * | 8/2016 | ........... A61K 39/105 |

OTHER PUBLICATIONS

Evans et al., Securing private images on user devices, 2018, The IP.com Journal, 13 pages. (Year: 2018).*

* cited by examiner

303

304

System service 3:40 PM

3:40 PM
It is detected that the "FileSync Helper" deletes a picture, which has been successfully intercepted
Tap to go to "Gallery" > "Albums" > "Recently Deleted" to confirm deleted content

305

11:48 AM
It is detected that the "Moment Album" deletes a picture, which has been successfully intercepted
Tap to go to "Gallery" > "Albums" > "Recently Deleted" to confirm deleted content

CONT.
FROM
FIG. 3(1)

Manage notifications

FIG. 3(2)

IMAGE DELETION OPERATION NOTIFICATION METHOD, DEVICE, AND STORAGE MEDIUM

CROSS-REFERENCE TO RELATED APPLICATIONS

This application is a national stage of International Application No. PCT/CN2022/142071, filed on Dec. 26, 2022, which claims priority to Chinese Patent Application No. 202210188074.7, filed on Feb. 28, 2022. The disclosures of both of the aforementioned applications are hereby incorporated by reference in their entireties.

TECHNICAL FIELD

This application relates to the field of user experience design technologies, and in particular, to an image deletion operation notification method, a device, and a storage medium.

BACKGROUND

To read and write data, application programs on electronic devices (such as smartphones or tablet computers) may generally acquire storage permissions of the electronic devices. Some application programs, after obtaining the storage permissions, may actively delete images stored on the electronic devices without user confirmation. Current electronic devices lack a mechanism for notifying users of image deletion operations of the application programs, which is not conducive to the users' timely discovery of the image deletion operations of the application programs and restoration of the deleted images.

SUMMARY

This application provides an image deletion operation notification method, a device, and a storage medium, so as to provide a mechanism for notifying the users of the image deletion operations of the application programs.

According to a first aspect, an embodiment of this application provides an image deletion operation notification method, including: displaying an image deletion prompt after detecting that a first application deletes an image, the image deletion prompt including a name of the first application, the first application being a third-party application; and displaying a first interface of a gallery application in response to an operation of opening the gallery application by a user, the first interface including an image deletion card, the image deletion card including the name of the first application, and the first interface being not a full-size image interface for displaying an original image.

The full-size image interface refers to an interface used for displaying an original image in the electronic device. Generally, the electronic device may display the full-size image interface after the user taps a thumbnail in the gallery application. The full-size image interface includes an original image corresponding to the tapped thumbnail and a title bar. The title bar may display relevant information of the original image, such as shooting information and deletion information of the original image. Exemplarily, the full-size image interface in this embodiment may be an interface as shown in a drawing such as in FIG. 7(2) or FIG. 19.

As an example, the above first application may be a "FileSync Helper".

This embodiment has the following beneficial effects:

After it is detected that the third-party application deletes the image, the user is notified of an image deletion operation of the third-party application through the image deletion prompt and the image deletion card, so that the user can find, in a timely manner, the image deletion operation of the third-party application and restore the deleted image, thereby achieving an effect of preventing image loss and improving user experience.

In some optional embodiments, the image deletion prompt is an image deletion banner corresponding to the first application, the image deletion banner including a timestamp and an unprompt button, the timestamp indicating a time when the first application deletes the image; and the notification method further includes: removing the image deletion banner corresponding to the first application in response to an operation of tapping the unprompt button by the user; and adding the first application to an application whitelist.

In some optional embodiments, after the adding the first application to an application whitelist, the method further includes: not displaying the image deletion banner corresponding to the first application after detecting that the first application deletes another image.

In combination with the foregoing example, the above unprompt button may specifically be a button "No more prompt for this application". In other words, after the electronic device displays the image deletion banner of the "FileSync Helper", the user taps the button "No more prompt for this application" of the image deletion banner, then the electronic device removes the image deletion banner, and the electronic device no longer displays the corresponding image deletion banner when the "FileSync Helper" deletes another image.

The above embodiment has the following advantages:

In this embodiment, the user can tap the unprompt button to add trusted applications to the application whitelist, so that the electronic device no longer sends notifications for the image deletion operations of the applications, so as to prevent interference with normal use of the user due to frequent notifications from the electronic device.

In some optional embodiments, the image deletion prompt is a notification message in a message notification bar of an electronic device; and after the detecting that a first application deletes an image, the method further includes: updating, in the notification message, a timestamp when the first application deletes the image to a time when the first application deletes another image after detecting that the first application deletes the another image.

In combination with the foregoing example, if the "FileSync Helper" deletes an image at 2:48 PM, a timestamp in the notification message corresponding to the "FileSync Helper" is "2:48 PM." If the "FileSync Helper" deletes another image at 3:40 PM, the timestamp in the notification message corresponding to the "FileSync Helper" is updated to "3:40 PM".

Exemplarily, a form of the notification message in the message notification bar may be shown in FIG. 3(1) and FIG. 3(2).

This embodiment has the following beneficial effects: display of too many notification messages with duplicate content in the message notification bar when a same application performs an image deletion operation multiple times is prevented. On the other hand, update of the timestamp helps the user confirm a time when the application last deleted an image.

In some optional embodiments, the message notification bar includes a combined notification, the combined notification including the image deletion prompt corresponding to the first application and an image deletion prompt corresponding to a second application.

Exemplarily, a specific style of the combined notification may be obtained with reference to a combined notification 301 shown in FIG. 3(1).

In some optional embodiments, the combined notification includes a first collapse control; and the notification method further includes: replacing the combined notification with a collapsed notification in response to an operation of tapping the first collapse control by the user, the collapsed notification including the name of the first application, a name of the second application, and a quantity of images deleted by the first application and the second application.

In combination with the foregoing example, when the "FileSync Helper" and "Moment Album" both delete images, the combined notification in the message notification bar may include an image deletion prompt corresponding to the "FileSync Helper" and an image deletion prompt corresponding to the "Moment Album".

A form of the collapsed notification may be obtained with reference to a collapsed notification 401 shown in FIG. 4.

The above embodiment has the following beneficial effects:

A plurality of notification messages are combined into a combined notification, and the user is allowed to collapse the combined notification, which can reduce a region occupied by the image deletion prompt in the message notification bar and help the user view other notification messages in the message notification bar except for the image deletion prompt.

In some optional embodiments, the first interface is an interface in the gallery application and most frequently browsed by the user, or the first interface is an interface first displayed after the gallery application is opened.

Exemplarily, the first interface may be a "Photos" interface. In other words, the "Photos" interface is most frequently browsed, so the gallery application displays the image deletion card only on the "Photos" interface. Alternatively, the "Photos" interface is first displayed after the gallery application is opened, so the gallery application displays the image deletion card only on the "Photos" interface.

This embodiment has the following advantages:

The user is more likely to see the image deletion card in the most frequently browsed interface or the first interface. Therefore, according to the method of this embodiment, there is a higher probability of notifying the user of the image deletion operation of the third-party application, and interference with the user's browsing of other interfaces of the gallery application can be prevented.

In some optional embodiments, the method further includes: displaying a second interface of the gallery application, the second interface including the image deletion card, and the second interface being different from the first interface.

Exemplarily, the first interface may be a "Photos" interface, and the second interface may be an "Albums" interface.

In other words, in this embodiment, the gallery application may display the image deletion card on a plurality of interfaces. Combined with an example in FIG. 11(1) and FIG. 11(2), the gallery application may display the image deletion card on four interfaces: "Photos", "Albums", "Highlights", and "Discover".

This embodiment has the following beneficial effects:

The image deletion card is displayed on the plurality of interfaces of the gallery application, which can ensure that the image deletion card is seen by the user after the user opens the gallery application, so as to ensure that the user is notified of the image deletion operation of the third-party application through the image deletion card.

In some optional embodiments, after the displaying a first interface of a gallery application, the method further includes: displaying, in response to an upward swiping operation of the user, the first interface after upward swiping, the first interface after upward swiping including the image deletion card.

For example, the gallery application displays the "Photos" interface, the image deletion card is displayed at the top of the "Photos" interface, thumbnails of one part of images in the gallery application are shown below the image deletion card, and after the user swipes upward on the "Photos" interface, the image deletion card is still displayed at the top of the "Photos" interface. At the same time, the gallery application displays thumbnails of another part of images below the image deletion card in response to the upward swiping operation of the user. In other words, the image deletion card may be fixedly displayed at the top of the interface of the gallery application.

Alternatively, the method further includes: displaying, in response to an upward swiping operation of the user, the first interface after upward swiping, the first interface after upward swiping not including the image deletion card.

Referring to FIG. 10(1) and FIG. 10(2) together, the gallery application displays the "Photos" interface, the image deletion card is displayed at the top of the "Photos" interface, thumbnails of one part of images in the gallery application are shown below the image deletion card, and after the user swipes upward on the "Photos" interface, the "Photos" interface is wholly used for displaying the thumbnails of the images in the gallery application and no longer displays the image deletion card. In other words, the image deletion card may be displayed, in a floating manner, at the top of the interface of the gallery application.

In this embodiment, the fixed display of the image deletion card has the following advantages:

The image deletion card is fixedly displayed, so that the image deletion card is more likely to be seen by the user, increasing a probability of successfully notifying the user of the image deletion operation of the third-party application.

The floating display of the image deletion card has the following advantages:

After the user swipes upward, a larger region is provided to display content to be originally displayed on the first interface. For example, in the "Photos" interface, after the user swipes upward, a larger region may be provided to display thumbnails of more images.

In some optional embodiment, after the displaying an image deletion prompt after detecting that a first application deletes an image, the method further includes: adding a name of a second application to the image deletion card after detecting that the second application deletes an image.

Exemplarily, after the "FileSync Helper" deletes an image, the image deletion card of the gallery application includes an application name, that is, "FileSync Helper". If it is detected later that the "Moment Album" also detects an image, an application name "Moment Album" is added to the above image deletion card. That is, the image deletion card includes names of the two applications "FileSync Helper" and "Moment Album".

In some optional embodiments, the method further includes: removing the name of the first application from the image deletion card if the first application is added to the application whitelist.

Exemplarily, when the "FileSync Helper" is not added to the application whitelist, the image deletion card includes the "FileSync Helper", and after the "FileSync Helper" is added to the application whitelist, the electronic device removes the "FileSync Helper" from the image deletion card.

This embodiment has the following beneficial effects:

The removal of the trusted applications in the application whitelist from the image deletion card prevents occupation of a too large region in the interface by the image deletion card due to display of too many applications.

In some optional embodiments, the image deletion card includes a card removal button; and the image deletion card is removed after the card removal button is tapped.

Exemplarily, the card removal button may be a "Got it" button 802 shown in FIG. 8(1). That is, after the user taps the "Got it" button, the electronic device removes a currently displayed image deletion card.

This embodiment has the following beneficial effects:

The user is allowed to manually remove the image deletion card after knowing that the third-party application deletes the image, so as to provide a larger region to display content originally displayed on the first interface. For example, after the user removes the image deletion card from the "Photos" interface, the "Photos" interface may display thumbnails of more images.

In some optional embodiments, the method further includes: displaying a preview interface of a first album in the gallery application in response to an operation of tapping the image deletion banner by the user, the preview interface of the first album including a first partition and a second partition, the first partition including thumbnails of images deleted by third-party applications in the gallery application, the second partition including thumbnails of images deleted by system applications in the gallery application.

Referring to FIG. 15(1) and FIG. 15(2) together, the preview interface of the first album may include a title "Deleted by third-party application" 1502 and "Others" 1503, a region below the "Deleted by third-party application" 1502 is the first partition displaying the thumbnails of the images deleted by the third-party applications, and a region below the "Others" 1503 is the second partition displaying the thumbnails of the images deleted by the system applications.

This embodiment has the following advantages:

The images deleted by the third-party applications and the images deleted by the system applications are displayed in partitions, so that the user can quickly confirm which images are deleted by the third-party applications.

In some optional embodiments, the first partition includes a first restore button; and the notification method further includes: restoring the images corresponding to the thumbnails displayed in the first partition in response to an operation of tapping the first restore button by the user.

Referring to FIG. 15(2) together, the first restore button may be a "Restore" button 1504 shown in FIG. 15(2). After the user taps the "Restore" button 1504, the electronic device restores all the images deleted by the third-party applications in the gallery application.

This embodiment has the following beneficial effects:

The user can restore all the images deleted by the third-party applications in batches only by tapping the first restore button once, which can simplify the operation of the user when a plurality of deleted images need to be restored, and improve usage experience.

In some optional embodiments, the first partition includes at least one sub-partition, each of the at least one sub-partition corresponding to one third-party application; the sub-partition being used for displaying thumbnails of images deleted by the corresponding third-party application.

Referring to FIG. 17 together, a title of each sub-partition may include a name of the corresponding third-party application, for example, "Deleted by FileSync Helper" 1701 or "Deleted by Moment Album" 1703, and a title of the second partition may be "Others" 1705. Thumbnails of images deleted by the "FileSync Helper" are displayed in a region below the "Deleted by FileSync Helper" 1701, and thumbnails of images deleted by the "Moment Album" are displayed in a region below the "Deleted by Moment Album" 1703.

This embodiment has the following beneficial effects:

The thumbnails of the images deleted by different applications are displayed in partitions, which helps the user accurately find an image deleted by a specific application.

In some optional embodiments, the method further includes: displaying a full-size image interface in response to an operation of tapping a thumbnail of a deleted image by the user, the full-size image interface including an original image and deletion information of the deleted image, the deletion information including a time when the deleted image was deleted and a name of an application deleting the deleted image.

In some optional embodiments, the method further includes: displaying a full-size image interface in response to an operation of tapping the image deletion banner by the user, the full-size image interface including an original image and deletion information of the deleted image, the deletion information including a time when the deleted image was deleted and a name of an application deleting the deleted image.

In other words, the user may view an original deleted image by tapping a thumbnail of the deleted image in the gallery application, or view the original deleted image by tapping the image deletion banner.

In some optional embodiments, the deletion information is displayed in a title bar of the full-size image interface.

The display of the deletion information in the title bar has the following beneficial effects:

The title bar highly concerned in the interface is reused to display the deletion information that the user cares about, so that the user can quickly confirm deletion information of a currently displayed image after opening the full-size image interface.

In some optional embodiments, the deletion information is displayed below a title bar of the full-size image interface; and the title bar of the full-size image interface is used for displaying a shooting time and a shooting location of the deleted image.

According to a second aspect of this application, an electronic device is provided, including: a memory and one or more processors; the memory being configured to store a computer program; the one or more processors being configured to execute the computer program and specifically configured to implement the image deletion operation notification method provided in any embodiment of the first aspect.

According to a third aspect of this application, a computer storage medium is provided, configured to store a computer program, and specifically configured to implement the image deletion operation notification method provided in any embodiment of the first aspect of this application when the computer program is executed.

Embodiments of this application provide an image deletion operation notification method, a device, and a storage medium. The method includes: displaying an image deletion prompt after detecting that a first application deletes an image, the image deletion prompt including a name of the first application, the first application being a third-party application; and displaying a first interface of a gallery application in response to an operation of opening the gallery application by a user, the first interface including an image deletion card, the image deletion card including the name of the first application, and the first interface being not a full-size image interface for displaying an original image. In the solution, the electronic device, after detecting that the third-party application deletes the image, notifies, through the image deletion prompt and the image deletion card, the user that an image is deleted by the application, so that the user can find, in a timely manner, an operation of deleting the image by the third-party application and restore the deleted image.

DESCRIPTION OF EMBODIMENTS

The following clearly and completely describes technical solutions in embodiments of this application with reference to the accompanying drawings in the embodiments of this application. Terms used in the following embodiments are only intended to describe particular embodiments, and are not intended to limit this application. As used in this specification and the appended claims of this application, a singular expression form, "one", "a", "the", "foregoing", "said", or "this", is intended to also include "one or more" expression form, unless clearly indicated to the contrary in the context. It should be further understood that, in the embodiments of this application, "one or more" means one, two or more. The expression "and/or" describes an association relationship between associated objects and represents that three relationships may exist. For example, A and/or B may represent: only A exists, both A and B exist, and only B exists, where A and B may be singular or plural. The character "/" generally indicates an "or" relationship between the associated objects.

Figure 1:
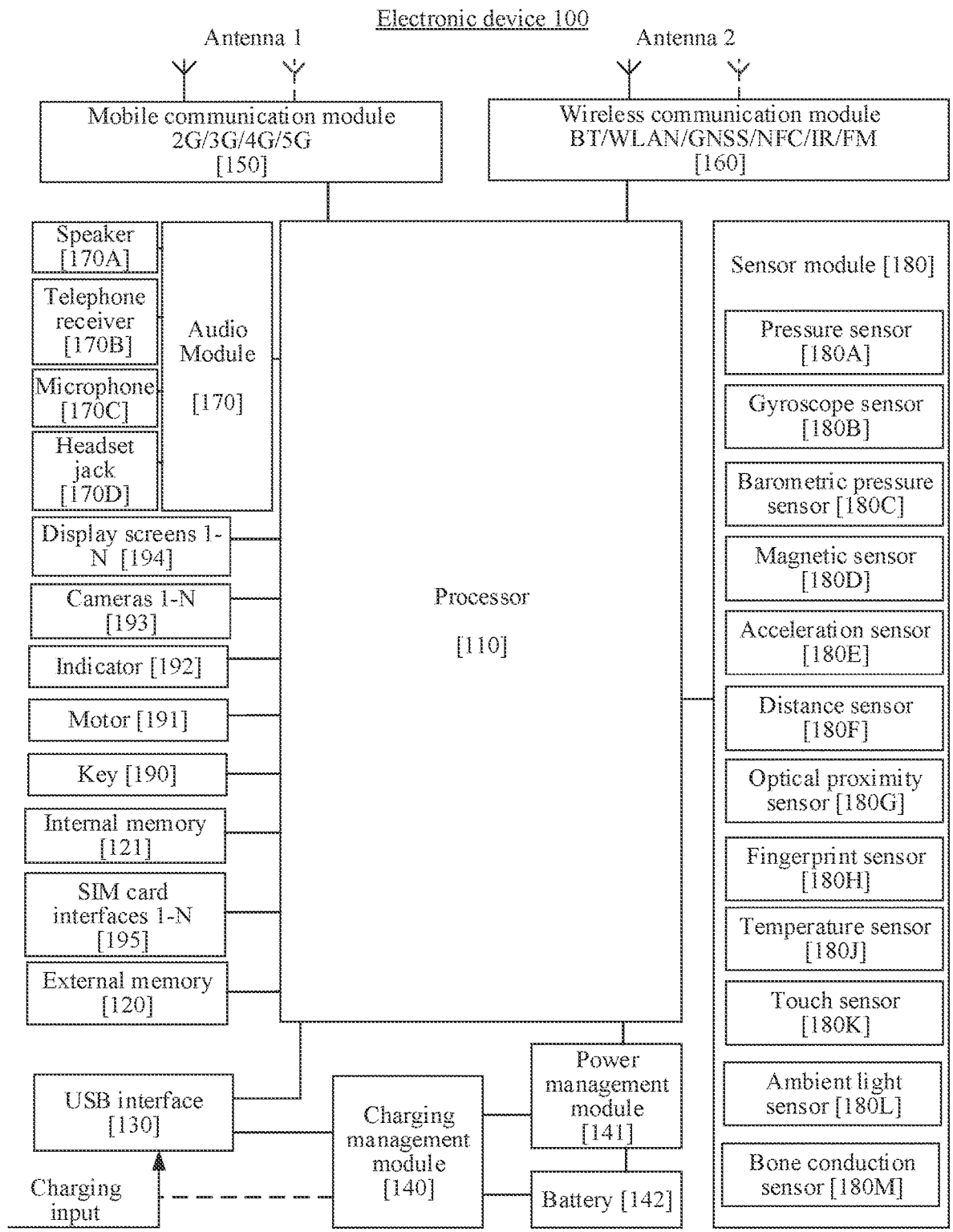
FIG. 1 is a schematic structural diagram of an electronic device according to an embodiment of this application.

FIG. 1 is a schematic structural diagram of an electronic device according to an embodiment of this application.

In some embodiments, the electronic device 100 may be a device such as a mobile phone (as shown in FIG. 1), a tablet computer, a desktop computer, a laptop computer, a notebook computer, an ultra-mobile personal computer (UMPC), a handheld computer, a netbook, a personal digital assistant (PDA), a wearable electronic device, or a smart watch.

Specific forms of the above smart home devices, servers, and electronic devices are not specially limited in this application.

As shown in FIG. 1, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a key 190, a motor 191, an indicator 192, a camera 193, a display screen 194, a subscriber identity module (SIM) card interface 195, and the like.

The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment constitutes no specific limitation on the electronic device 100. In some other embodiments, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be separate devices, or may be integrated into one or more processors.

The controller may be a nerve center and a command center of the electronic device 100. The controller may generate an operation control signal according to instruction operation code and a time-sequence signal to complete control of instruction fetching and instruction execution.

A memory may also be disposed in the processor 110, configured to store instructions and data. In some embodiments, the memory in the processor 110 is a cache memory. The memory may store instructions or data recently used or cyclically used by the processor 110. The processor 110, if needing to use the instructions or the data again, may directly invoke the instructions or the data from the memory. Repeated access is prevented, and waiting time of the processor 110 is reduced, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve utilization of the antennas. For example, the antenna 1 may be multiplexed as a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, convert the signal into an electromagnetic wave through the antenna 1, and radiate the electromagnetic wave. In some embodiments, at least some function modules of the mobile communication module 150 may be disposed in the processor 110. In some embodiments, at least some of the functional modules of the mobile communication module 150 may be disposed in a same device as at least some of modules of the processor 110.

The wireless communication module 160 may provide a solution to wireless communication applied to the electronic device 100, including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology.

In this embodiment, when the electronic device 100 enables a cloud synchronization function, the electronic device 100 may access a network through a mobile communication module or a wireless communication module, thereby synchronizing images stored in the electronic device with images in the cloud. For example, the electronic device 100, after taking a new photo, uploads the new photo to the cloud for storage via the network. When a photo in the cloud is deleted, the electronic device 100 may also synchronously delete the photo locally.

The electronic device 100 implements a display function by using the GPU, the display screen 194, the application processor, and the like. The GPU is a microprocessor for image processing and connects the display 194 and the application processor. The GPU is configured to perform mathematical and geometric calculations, and is configured to render graphics. The processor 110 may include one or more GPUs that execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a mini LED, a micro LED, a micro-OLED, a quantum dot light emitting diode (QLED), or the like. In some embodiments, the electronic device 100 may include 1 or N display screens 194. N is a positive integer greater than 1.

A series of graphical user interfaces (GUIs) may be displayed on the display screen 194 of the electronic device 100, and these GUIs are main screens of the electronic device 100. Generally, a size of the display screen 194 of the electronic device 100 is fixed, and only a limited number of controls can be displayed in the display screen 194 of the electronic device 100. A control is a GUI element, is a software component included in an application program, and controls all data processed by the application program and an interaction with these data, and the user may interact with the control through a direct manipulation, to read or edit related information of the application program. Generally, the controls may include visual interface elements such as icons, keys, menus, tabs, text boxes, dialog boxes, status bars, navigation bars, and Widgets.

In this embodiment, after the user opens a gallery application of the electronic device 100, the display screen 194 displays an interface of the gallery application, the interface of the gallery application includes a plurality of images, and the user may browse, in the interface of the gallery application, images stored locally on the electronic device 100 and images stored in the cloud.

The electronic device 100 may implement a shooting function by using the ISP, the camera 193, the video codec, the GPU, the display screen 194, the application processor, and the like.

The camera 193 is configured to capture a still image or video. An optical image is generated for an object by using a lens and is projected onto a photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard RGB or YUV format. In some embodiments, the electronic device 100 may include 1 or N cameras 193, and N is a positive integer greater than 1.

In this embodiment, the user may open a camera application (or another application with a camera function) installed on the electronic device 100, and use the camera application to invoke photos or videos captured by the camera. The captured photos or videos may be saved locally and/or in the cloud of the electronic device 100, and the user may view the captured photos or videos from the gallery application (or another application with an image browsing function).

The external memory interface 120 may be configured to be connected to an external memory card such as a micro SD card, to expand a storage capability of the electronic device 100. The external memory card communicates with the processor 110 by using the external memory interface 120, to implement a data storage function, for example, store files such as music and a video into the external memory card.

The internal memory 121 may be configured to store computer-executable program code. The executable program code includes instructions. The processor 110 runs the instructions stored in the internal memory 121, to implement various functional applications and data processing of the electronic device 100. For example, in this embodiment, the processor 110 may perform scene editing by executing the instructions stored in the internal memory 121. The internal memory 121 may include a program storage region and a data storage region. The program storage region may store an operating system, an application program required by at least one function (such as a sound playback function and an image display function), and the like. The data storage region may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, a universal flash storage (UFS), or the like. The processor 110 runs the instructions stored in the internal memory 121, and/or the instructions stored in the memory disposed in the processor, to perform various function applications and data processing of the electronic device 100.

In this embodiment, pictures and videos locally saved by the electronic device 100 are stored in the internal memory in a form of image data.

In addition, an operating system runs on the foregoing components, for example, an Android open-source operating system developed by Google. An application program (which may be referred to as an application) may be installed and run on the operating system.

During the running of the application program, data stored in the electronic device 100 may need to be read, and new data may need to be written. For example, when a picture editing application program is running, a picture specified by the user needs to be read in order to edit the picture. After the editing is completed, an edited new picture needs to be written. Therefore, most application programs may obtain a storage permission of the electronic device 100 through user authorization or in another manner.

In some scenarios, an application program with a storage permission may automatically delete an image stored in the electronic device 100 without user confirmation. For example, when an available storage space of the electronic device 100 is insufficient, a file management application program may delete, without user confirmation, images that have not been viewed for a long time. In this case, images in a gallery may be lost without the user's perception, resulting in extremely poor usage experience for the user.

In view of the above problems, this application provides an image deletion operation notification method. By implementing the method provided in this application, the electronic device can prompt the user that an image is deleted in various manners after the image is deleted by an application, so that the user can confirm and retrieve the deleted image in a timely manner, thereby improving the usage experience of the user.

The image as referred to in any embodiment of this application may refer to a picture or video.

Embodiment 1

In this embodiment, after an image deletion operation occurs, the electronic device may prompt, through a banner notification, the user that an image is deleted.

Figure 2:
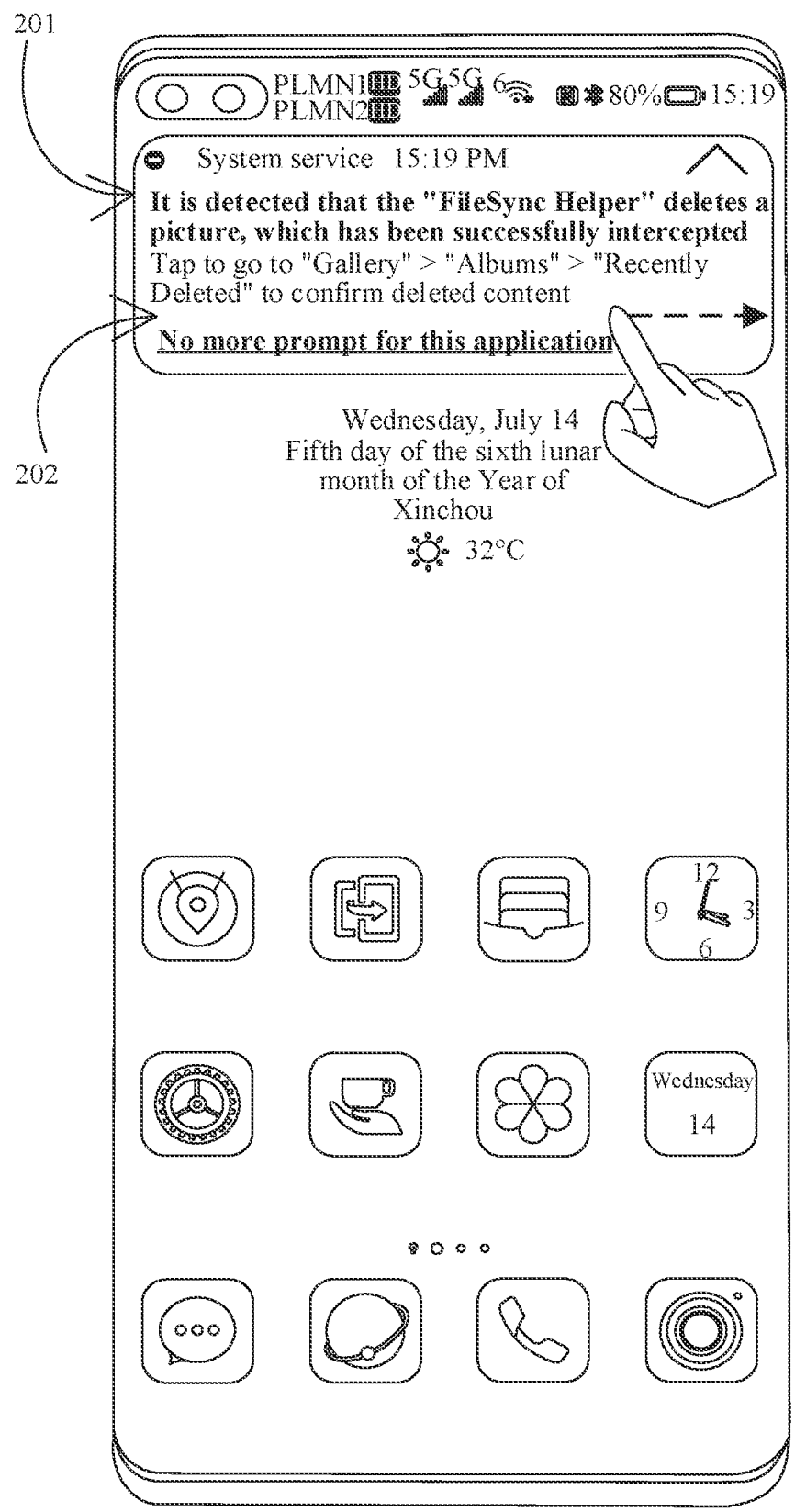
FIG. 2 is a schematic diagram of a display interface of an image deletion banner according to an embodiment of this application.

Referring to FIG. 2, when another application other than the gallery application performs the image deletion operation, an image deletion banner 201 shown in FIG. 2 may pop up at the top of a display screen of the electronic device 100. The image deletion banner 201 includes a name of the application program performing the image deletion operation, a time when the image was deleted, and path information for viewing the deleted image.

Taking FIG. 2 as an example, after the "FileSync Helper" application program deletes an image, the image deletion banner 201 including a notification text (it is detected that the "FileSync Helper" deletes a picture, which has been successfully intercepted) pops up on the electronic device 100, thereby notifying the user that an image is deleted by the "FileSync Helper" application program. A timestamp "15:19 PM" in an upper right corner of the image deletion banner 201 indicates that the "FileSync Helper" deleted the image at 15:19 PM.

Path information for viewing the deleted image (i.e., "Gallery">"Album">"Recently deleted") is further displayed below the notification text. The path information is used for prompting the user that the "Album" interface of the "Gallery" application can be opened to view the deleted image in a "Recently deleted" album of the "Album" interface.

It should be noted that one image deletion banner corresponds to only one application. In other words, one image deletion banner is only used for notifying the user of an image deletion operation of one application. If a plurality of applications delete images at the same time, the image deletion banner corresponding to each application may successively pop up on the electronic device 100.

As an example, when both the "FileSync Helper" and "Moment Album" applications delete images within a short period of time, the electronic device 100 pops up two image deletion banners corresponding to the two applications in sequence based on a sequence of the deleted images. For example, the image deletion banner corresponding to the "Moment Album" pops up first, notifying the user that the image is deleted by the "Moment Album", and then the image deletion banner corresponding to the "FileSync Helper" pops up, notifying the user that the image is deleted by the "FileSync Helper".

It should be noted that the image deletion banner shown in FIG. 2 is merely an example of a banner notification provided in this embodiment. In another optional embodiment, a structure and text content of the image deletion banner may be different from those in the example in FIG. 2. This embodiment does not limit the specific structure and text content of the image deletion banner, provided that the user can be informed that an image is deleted by an application.

The user may tap the image deletion banner displayed on the display screen to jump directly to an interface for viewing the deleted image. With reference to the example in FIG. 2, after the user taps the image deletion banner 201, the electronic device 100 can jump to the "Recently Deleted" album of the gallery application. In this case, an interface of the "Recently Deleted" album is displayed on the display screen of the electronic device 100.

When the image deletion banner is displayed at the top of the display screen, the user can directly remove the image deletion banner that pops up at the top of the display screen.

Still referring to FIG. 2, in one removal manner, the user swipes right at the image deletion banner 201 to remove the image deletion banner 201.

In another removal manner, the user taps an unprompt button 202 in the image deletion banner 201, that is, the button "No more prompt for this application" in FIG. 2.

In some optional embodiments, the electronic device 100 may alternatively provide another removal manner different from the above removal manners, which is not limited in this embodiment.

When the user taps the unprompt button 202, the electronic device 100 removes the current image deletion banner and an image deletion banner (if any) corresponding to a same application program in the message notification bar, and when the application program deletes another image later, the image deletion banner may no longer pop up on the electronic device 100.

With reference to the example in FIG. 2, after the "File-Sync Helper" deletes an image, an image deletion banner pops up on the electronic device 100 to notify the user that an image is deleted by the "FileSync Helper". In this case, the user taps the "No more prompt for this application" button in the image deletion banner. Thereafter, each time the "FileSync Helper" deletes an image, the image deletion banner does not pop up on the electronic device 100. That is, the electronic device 100 ignores the image deletion operation of the "FileSync Helper".

In some optional embodiments, an application whitelist may be configured in the electronic device 100. When an image is deleted by an application, the electronic device 100 inquires whether the application whitelist includes the application that deletes the image. If the application whitelist includes the application that deletes the image, an image deletion banner does not pop up on the electronic device 100, and if the application whitelist does not include the application that deletes the image, the image deletion banner pops up on the electronic device 100.

An initial application whitelist (that is, an application whitelist when the electronic device 100 leaves a factory) may include system applications preset in the electronic device 100, and may also include several pre-specified third-party applications. For example, a "Gallery" application that comes with an operating system is included. When the user deletes an image through a system application, such as "Gallery", an image deletion banner may not pop up on the electronic device 100, which prevents interference with normal use of the user due to frequent popping up of the image deletion banner. In subsequent embodiments, illustration is based on an example in which the gallery application is an application in the above application whitelist.

Further, if the user taps an unprompt button of an image deletion banner corresponding to an application after the banner pops up, the electronic device 100 adds the application to the application whitelist, so that, when the application deletes another image, the corresponding image deletion banner may not pop up on the electronic device 100.

With reference to the example in FIG. 2, after the image deletion banner 201 shown in FIG. 2 pops up on the electronic device 100, the user taps the unprompt button 202, and the electronic device 100 adds the "FileSync Helper" to the application whitelist. When the "FileSync Helper" deletes another image, the image deletion banner no longer pops up on the electronic device 100.

In some optional embodiments, the electronic device 100 may alternatively provide an interface for manually setting the application whitelist, and the user may manually add one or more applications to the application whitelist in this interface.

The setting of the unprompt button and the application whitelist above has the following beneficial effects:

Image deletion operations performed by some applications are often performed in response to operations of the user. In other words, the image deletion operations are in line with intentions of the user. If image deletion banners also pop up for these image deletion operations in line with the intentions of the user on the electronic device, the normal use of the user may be interfered with. By setting the unprompt button and the application whitelist, the user can specify the image deletion operations of which applications are image deletion operations in line with the intentions of the user, so as to prevent interference with the normal use of the user due to frequent popping up of the image deletion banners on the electronic device.

For example, the user, after using an image editing application, may generally delete, through the image editing application, an original image before editing and retain a new edited image. An image deletion operation performed by the image editing application is in line with an intention of the user. In this case, when an image deletion banner corresponding to the image editing application pops up on the electronic device for the first time, the user can tap the unprompt button in the banner, and the corresponding image deletion banner may not pop up when the user later deletes, through the image editing application, the original image before editing.

After the image deletion banner pops up, if the user taps or removes the image deletion banner within a preset display time (e.g., within 2 seconds), the electronic device may no longer display the image deletion banner. If the user does not tap or remove the image deletion banner within the display time, the electronic device 100 may move the image deletion banner into a message notification bar (also called a notification center or a message center).

The display of the image deletion banner in the message notification bar has the following beneficial effects:

If the application deletes the image when the user does not use the electronic device 100, the image deletion banner that pops up at the top of the display screen is easily ignored by the user. The image deletion banner not tapped or removed by the user is retained in the message notification bar, so that, whenever the application deletes an image, the user can know the image deletion operation of the application through the image deletion banner retained in the message notification bar. That is, the image deletion banner is displayed in the message notification bar, which can increase a probability of discovering the image deletion operation of the application by the user, and help the user retrieve the deleted image and control a behavior of the application.

Figure 3:
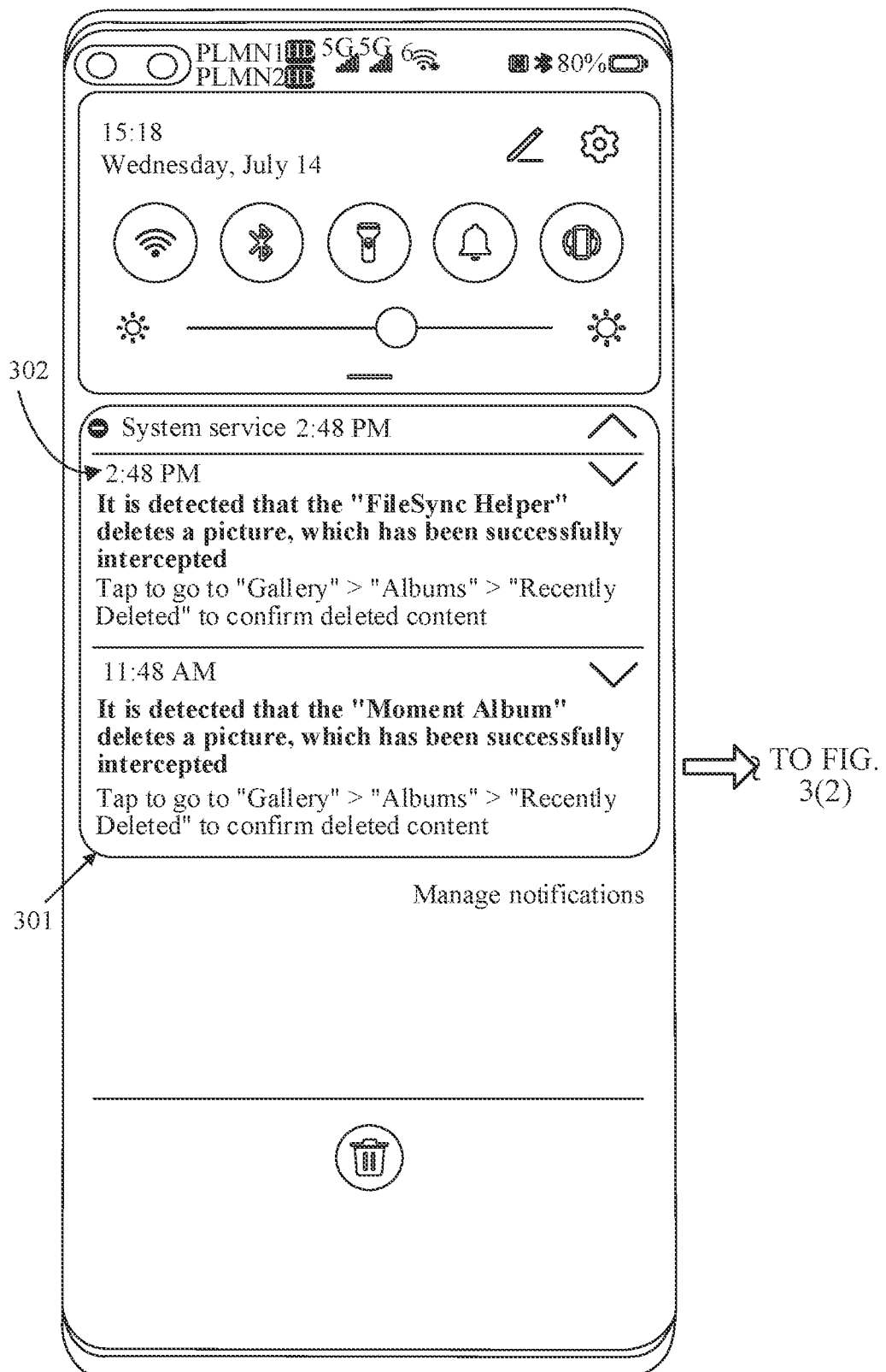
FIG. 3(1) and FIG. 3(2) are a schematic diagram of a display interface of an image deletion banner in a message notification bar according to an embodiment of this application.

Refer to FIG. 3(1) and FIG. 3(2) which are a schematic diagram of an interface where the electronic device 100 displays an image deletion banner in the message notification bar.

When the message notification bar includes a plurality of image deletion banners, to prevent occupation of a too large region, the plurality of image deletion banners are displayed in the message notification bar in a form of a combined notification. For example, in FIG. 3(1) and FIG. 3(2), two image deletion banners corresponding to the "FileSync Helper" and the "Moment Album" are combined and displayed in a combined notification 301 of a system service.

In some optional embodiments, each application in the message notification bar displays only one corresponding image deletion banner. When an application has successively performed a plurality of image deletion operations, the electronic device 100 updates a timestamp of the corresponding image deletion banner in the message notification bar to ensure that the timestamp indicates a time when the application last performed an image deletion operation.

Referring to an example in FIG. 3(1), at 2:48 PM, the "FileSync Helper" deleted a picture, so an image deletion banner corresponding to the "FileSync Helper" is displayed in the message notification bar, and a timestamp 301 in an upper left corner of the image deletion banner corresponding to the "FileSync Helper" indicates a time when the last image deletion operation of the "FileSync Helper" occurred, that is, 2:48 PM.

Referring to an example in FIG. 3(2), after a period of time, the "FileSync Helper" deletes another picture, so the electronic device 100 updates a timestamp of the image deletion banner corresponding to the "FileSync Helper" in the message notification bar, which is updated to a timestamp 303 in FIG. 3(2). The updated timestamp indicates a time when the "FileSync Helper" deleted a picture for the second time, that is, 3:40 PM.

In some optional embodiments, the electronic device 100 may alternatively display a type of a file deleted by an application in the image deletion banner, that is, display whether a picture or a video is deleted.

Exemplarily, after the "FileSync Helper" deletes a picture, the electronic device 100 displays an image deletion banner corresponding to the "FileSync Helper", and text in the image deletion banner is: it is detected that the "FileSync Helper" deletes the picture, which has been successfully intercepted.

After a period of time, the electronic device 100 detects that a video is deleted by the "FileSync Helper", and the electronic device 100 updates the text of the above image deletion banner to: it is detected that the "FileSync Helper" deleted the picture and the video, which has been successfully intercepted.

The above embodiment has the following beneficial effects: It is convenient for the user to confirm, through the image deletion banner, whether a picture or a video is deleted, so that the user can perform a different operation according to a different type of the deleted file.

In some optional embodiments, to facilitate the user to view other notification messages in the message notification bar except the image deletion banner, the user can tap a first collapse control 304 in the combined notification 301 to collapse all the image deletion banners in the combined notification.

Figure 4:
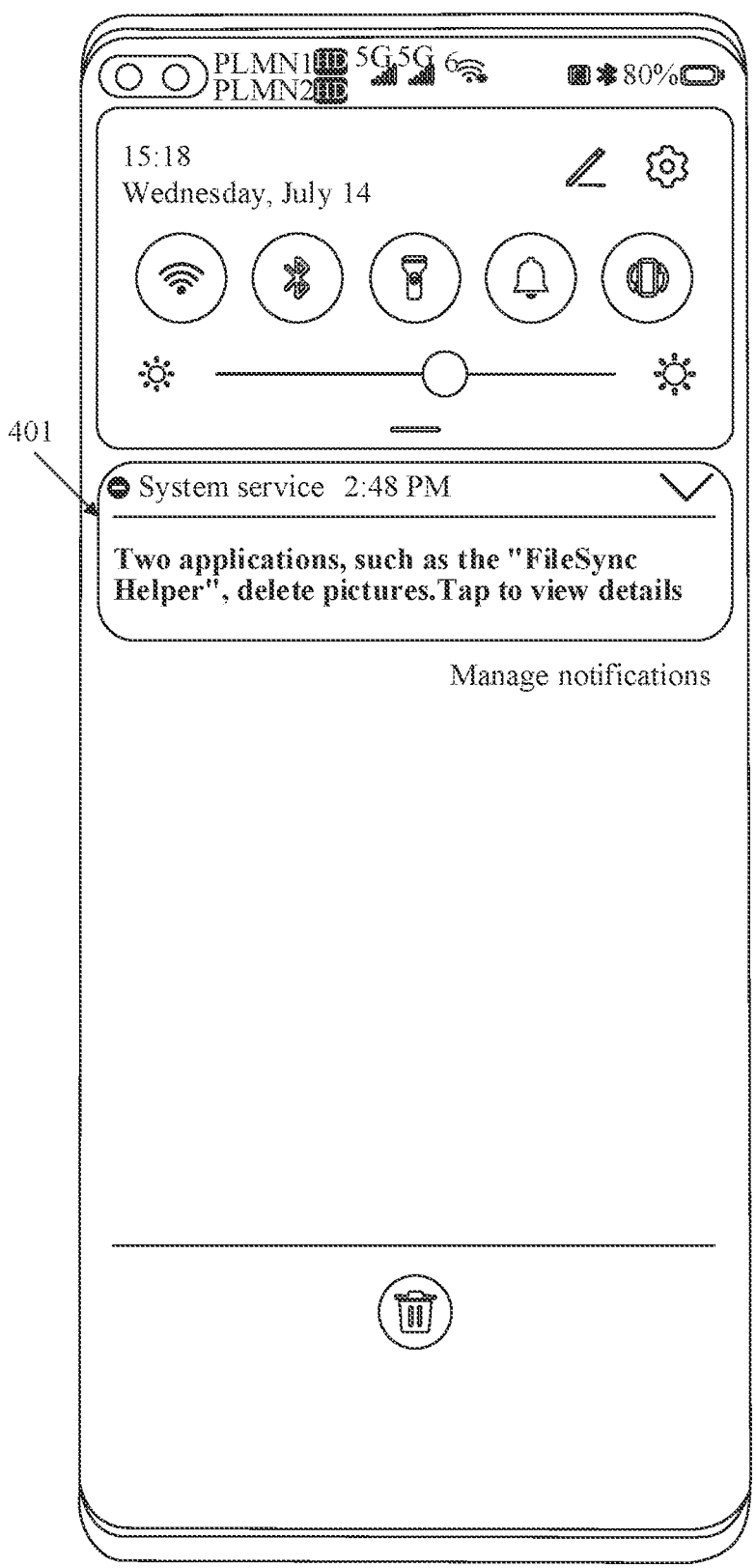
FIG. 4 is a schematic diagram of an interface when an image deletion banner in a message notification bar is collapsed according to an embodiment of this application.

Exemplarily, referring to FIG. 3(1), FIG. 3(2), and FIG. 4, after the user taps the first collapse control 304 shown FIG. 3(2), the electronic device hides all the image deletion banners in the message notification bar, and displays a collapsed notification 401 as shown in FIG. 4 in the message notification bar. The collapsed notification is used for indicating deletion of a picture and a quantity of applications deleting pictures.

The user may tap the collapsed notification 401 to expand the collapsed image deletion banners again. In other words, after the user taps the collapsed notification 401 shown in FIG. 4, the message notification bar of the electronic device 100 can be restored to the interface shown in FIG. 3(1) or FIG. 3(2).

Optionally, after the image deletion banners are collapsed, a timestamp corresponding to the above collapsed notification may be a timestamp closest to a current moment in all the collapsed image deletion banners.

Still referring to FIG. 3(1) and FIG. 3(2), when the image deletion banners are displayed in the message notification bar, the electronic device 100 may hide the unprompt button of each image deletion banner by default, and the user may tap a second collapse control 305 corresponding to one image deletion banner to display the unprompt button of this image deletion banner.

Figure 5:
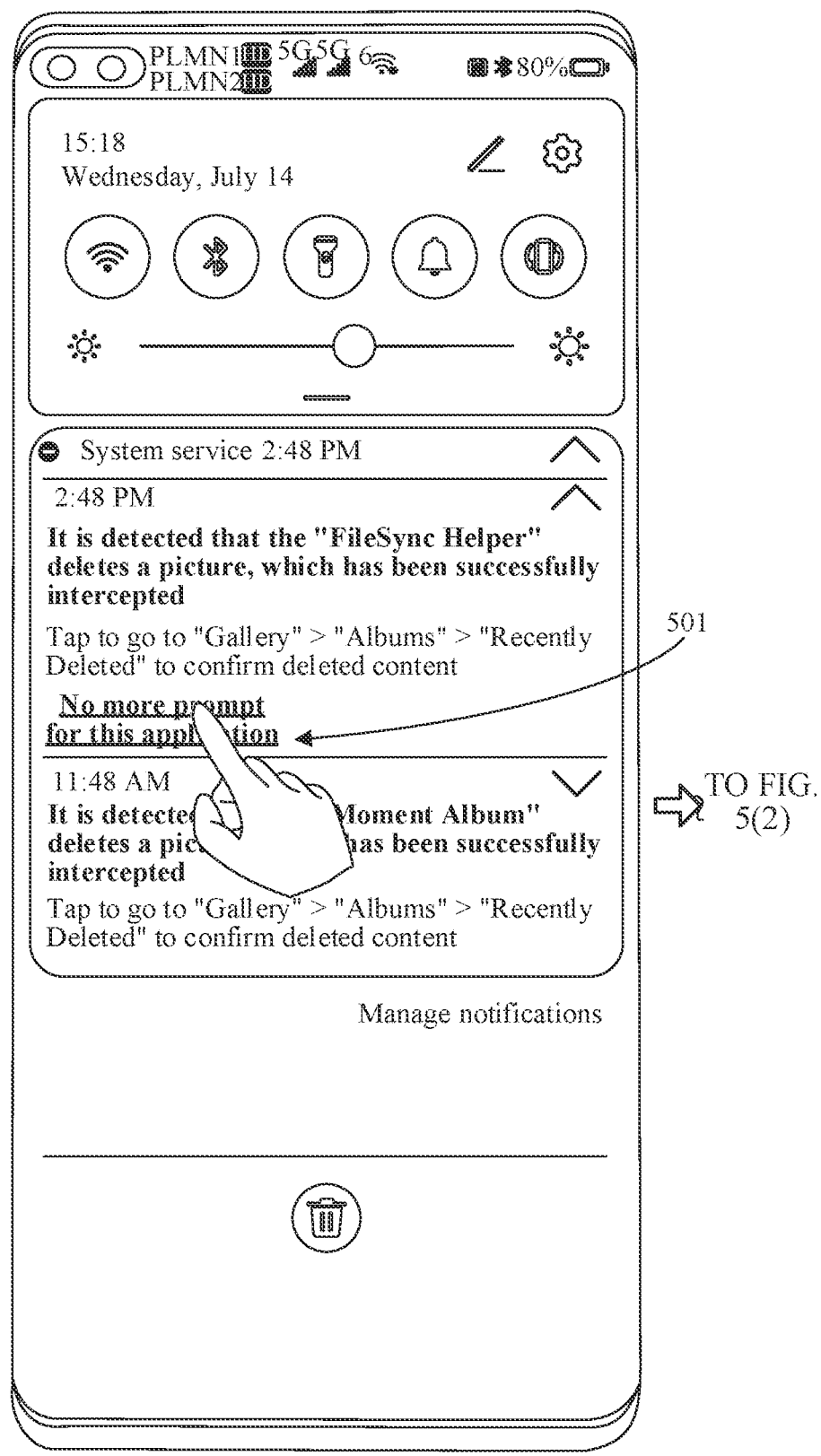
FIG. 5(1) and FIG. 5(2) are a schematic diagram of a user interface for canceling an image deletion banner according to an embodiment of this application.
Figure 5:
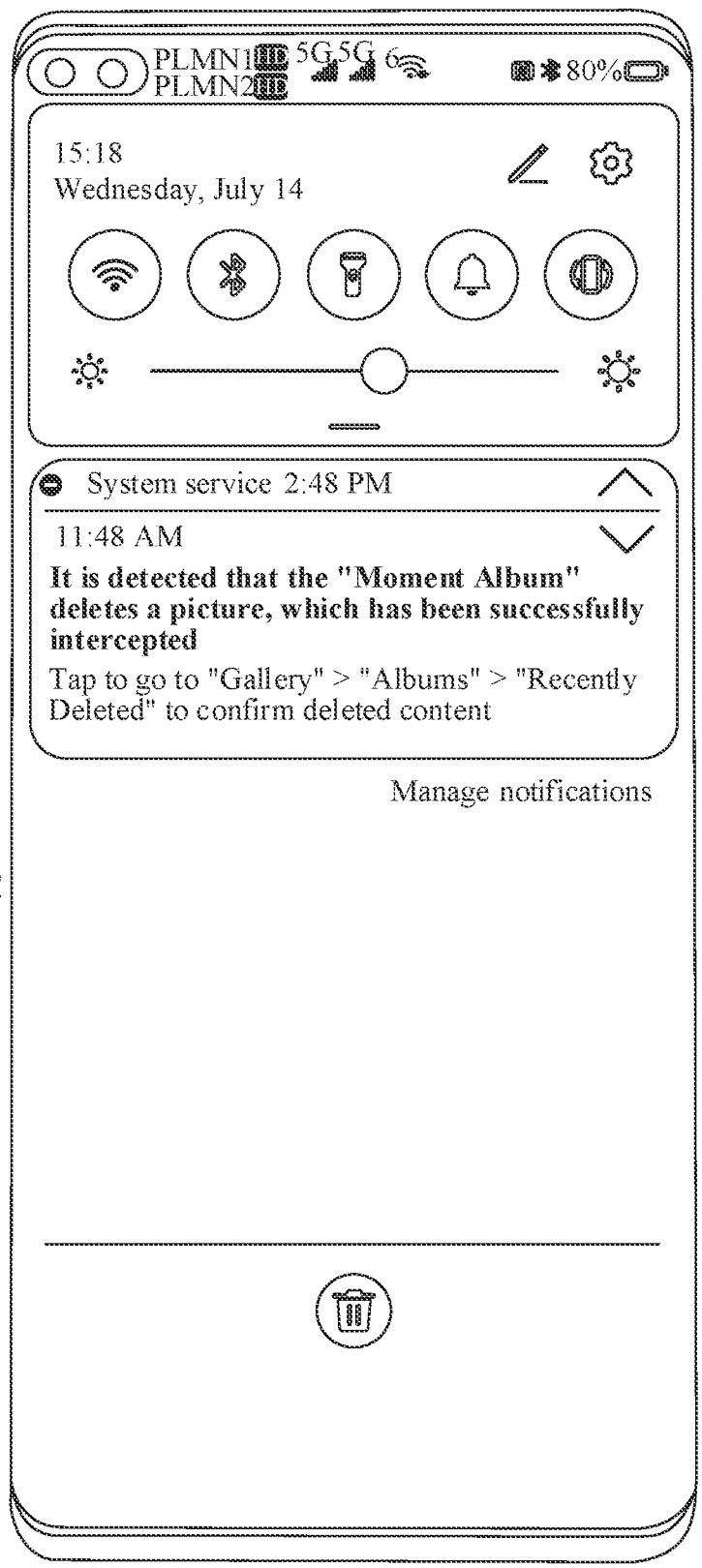

Referring to FIG. 3(1), FIG. 3(2), FIG. 5(1), and FIG. 5(2), after the user taps the second collapse control 305 shown in FIG. 3(2), the electronic device 100 displays the unprompt button of the image deletion banner corresponding to the "FileSync Helper" in the message notification bar, that is, the "No more prompt for this application" button 501 shown in FIG. 5(1).

Similar to FIG. 2, the user can tap the unprompt button in the message notification bar to remove the corresponding image deletion banner in the message notification bar.

Taking FIG. 5(1) and FIG. 5(2) as an example, after the electronic device 100 displays the "No more prompt for this application" button 501 shown in FIG. 5(1), the user taps the button 501, and then the electronic device 100 removes the image deletion banner corresponding to the "FileSync Helper" in the message notification bar and only retains the image deletion banner corresponding to the "Moment Album".

As described above, when the image deletion banner is tapped by the user, the electronic device 100 may display the interface for viewing the deleted image.

In this embodiment, the deleted image may be temporarily stored in the "Recently Deleted" album. If an image in the "Recently Deleted" album expires and has not been restored, the electronic device 100 completely deletes the image from the "Recently Deleted" album. "Expire" means that a time when the image enters the "Recently Deleted" album is longer than a preset expiration time, for example, longer than 30 days.

Figure 6:
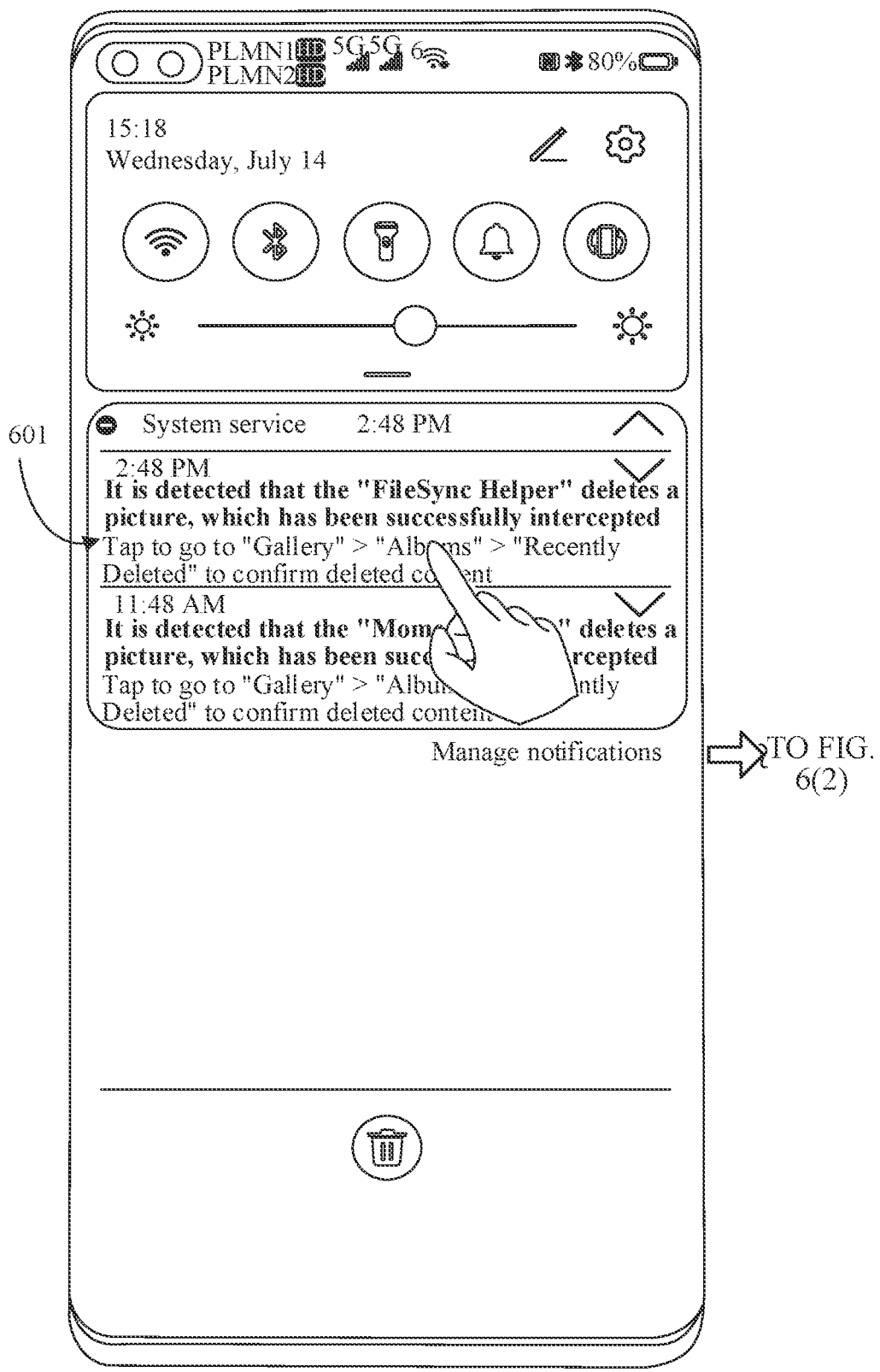
FIG. 6(1) and FIG. 6(2) are a schematic diagram of a user interface when an image deletion banner is tapped according to an embodiment of this application.
Figure 6:
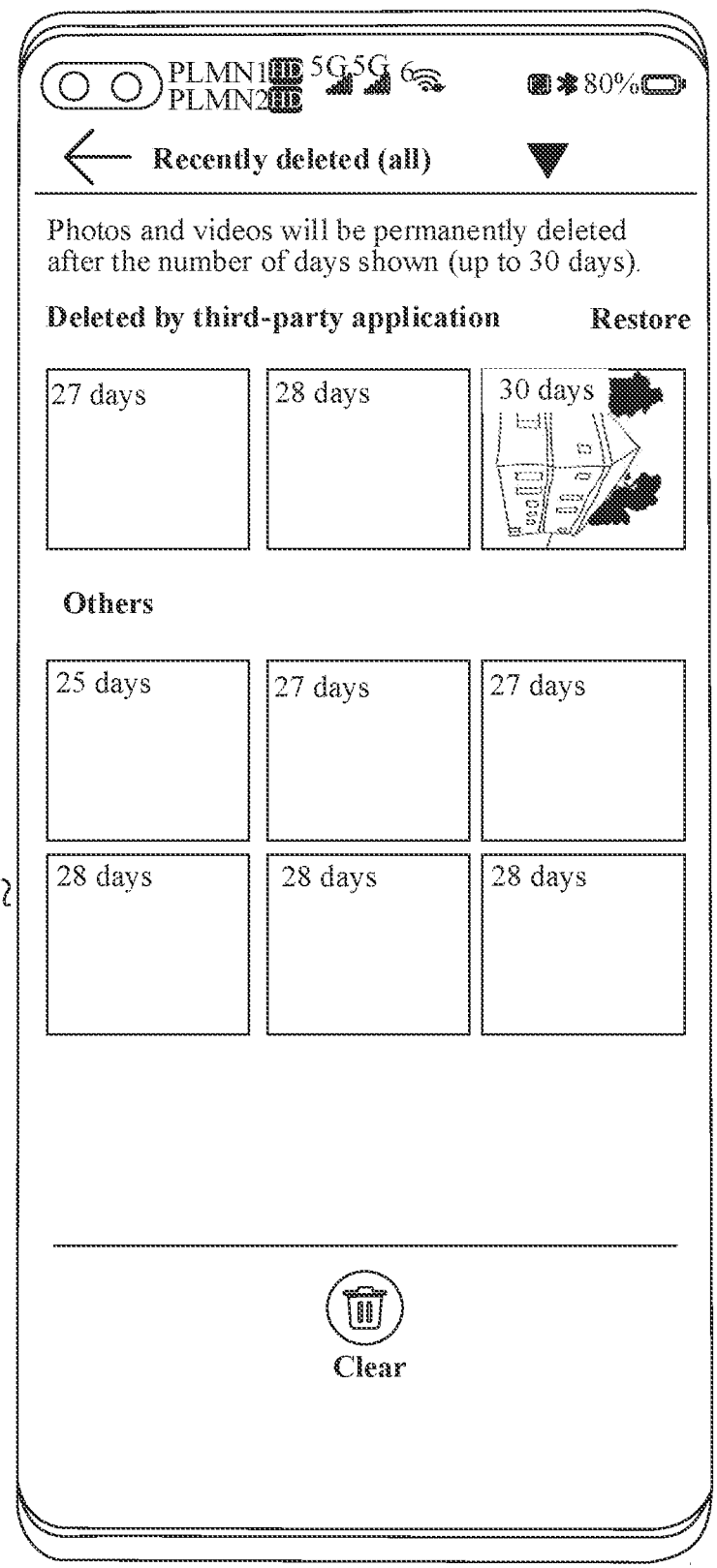

Referring to FIG. 6(1), when an image deletion banner 601 in the message notification bar is tapped by the user, the electronic device 100 may jump to the "Recently Deleted" album of the gallery application, and display a browsing interface of the "Recently Deleted" album as shown in FIG. 6(2).

As shown in FIG. 6(2), the browsing interface of the "Recently Deleted" album includes thumbnails of images in the album. The user may tap and swipe up and down the browsing interface of the "Recently Deleted" album to view the thumbnails of all the images in the album, and may also tap any one of the thumbnails to view the corresponding image in a full-size image interface of the "Recently Deleted" album.

In some optional embodiments, when the image deletion banner is tapped, the electronic device 100 may alternatively directly display the full-size image interface of the "Recently Deleted" album.

Figure 7:
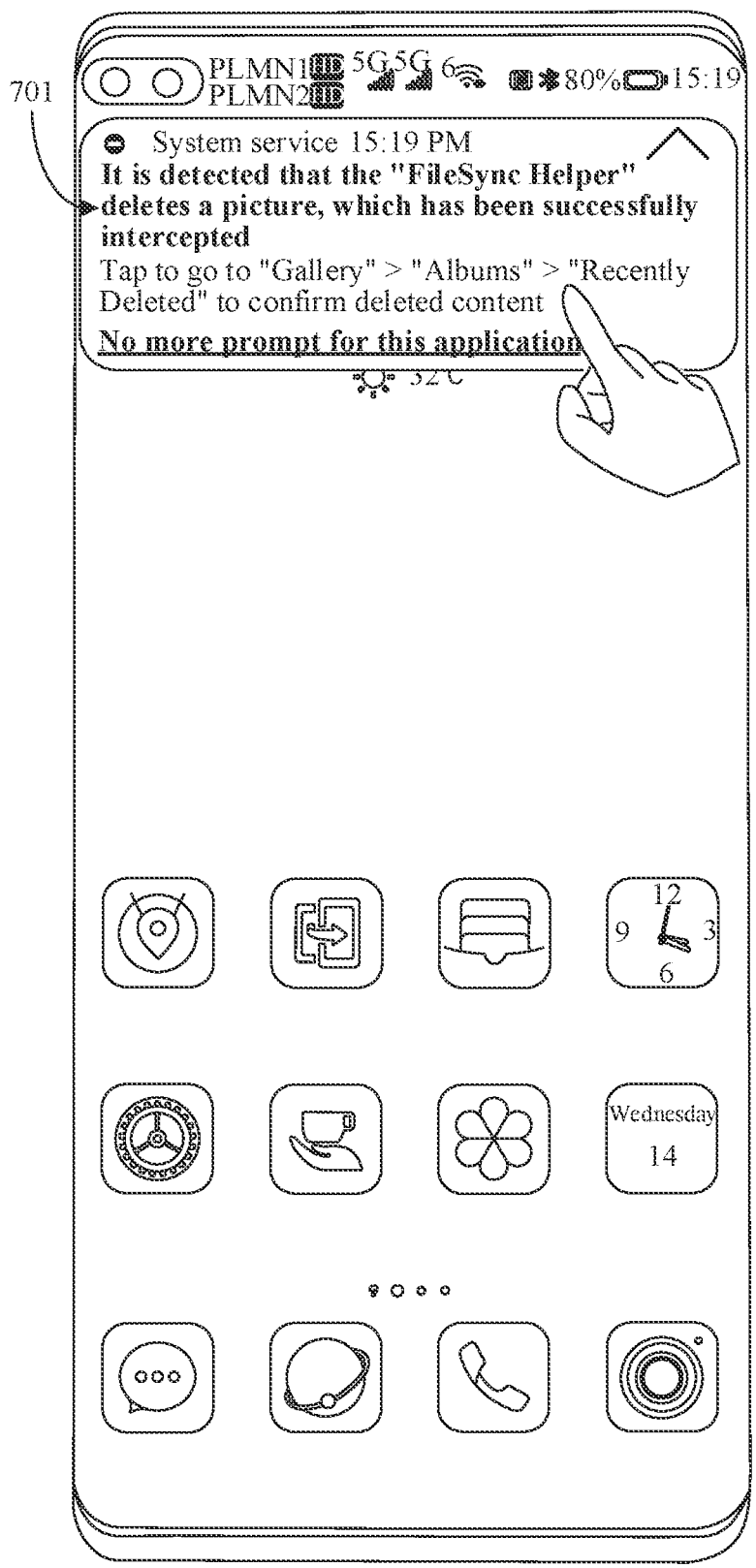
FIG. 7(1) and FIG. 7(2) are a schematic diagram of a user interface when another image deletion banner is tapped according to an embodiment of this application.
Figure 7:
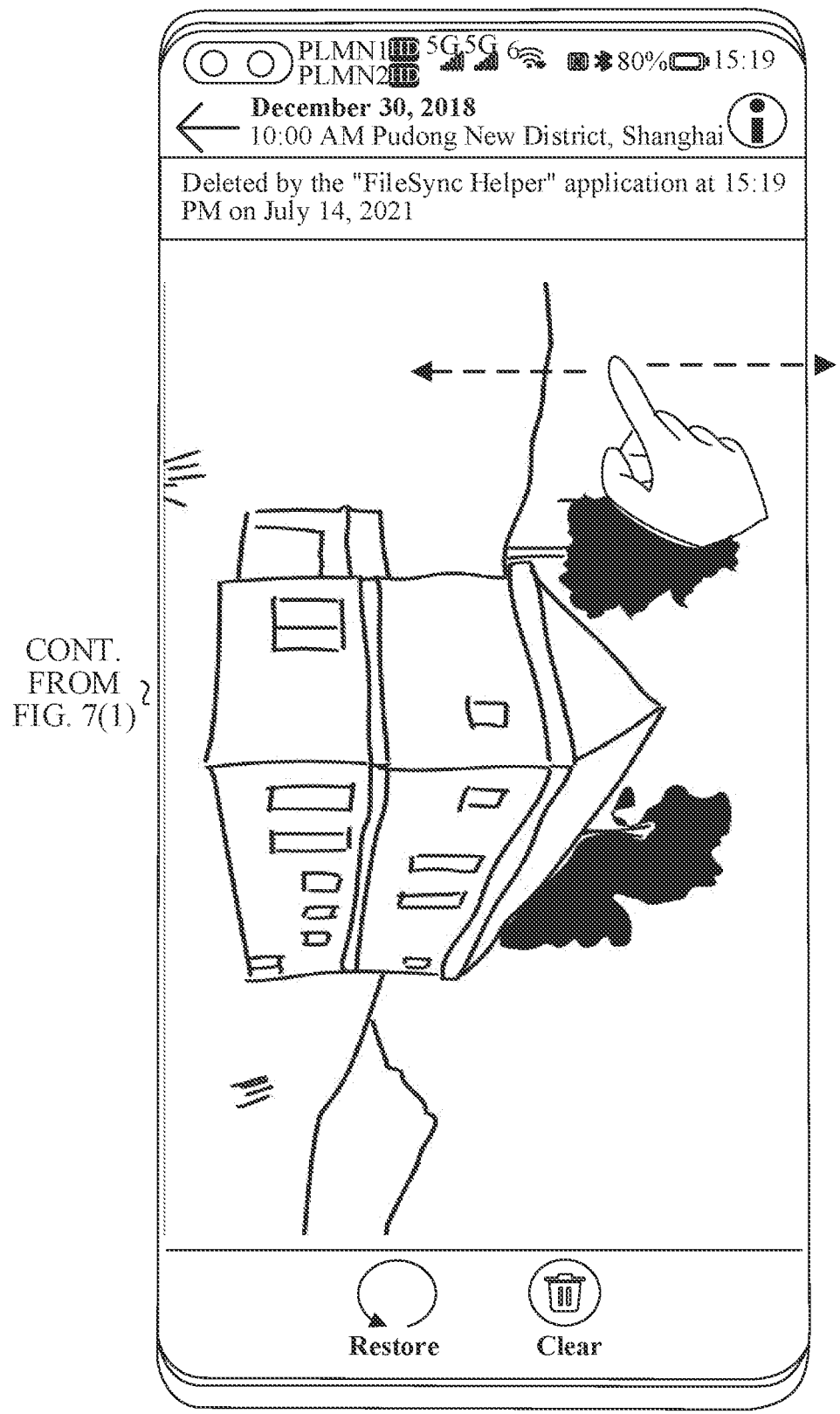

FIG. 7(1) and FIG. 7(2) are taken as an example. After the "FileSync Helper" deletes an image, an image deletion banner 701 as shown in FIG. 7(1) pops up at the top of the display screen of the electronic device 100, notifying the user that an image is deleted by the "FileSync Helper".

After the user taps any region in the image deletion banner 701 popping up except the "No more prompt for this application" button, the electronic device 100 may display, on the display screen, a full-size image interface of a picture deleted by the "FileSync Helper" in the "Recently deleted" album as shown in FIG. 7(2).

The full-size image interface can display only one image. Therefore, if an application deletes a plurality of images, an image last deleted by the application can be displayed on the interface when the electronic device 100 jumps from the image deletion banner to the full-size image interface shown in FIG. 7(2).

For example, in FIG. 7(1) and FIG. 7(2), when the image deletion banner 701 pops up on the electronic device 100, the "FileSync Helper" has deleted a plurality of images, and when the user taps the image deletion banner 701, the electronic device 100 jumps to the full-size image interface shown in FIG. 7(2) on which an image last deleted by the "FileSync Helper" is displayed.

In some optional embodiments, the user may swipe left or right on the full-size image interface shown in FIG. 7(2) to view a next or previous deleted image.

Exemplarily, the user may swipe left to view the next deleted image, or swipe right to view the previous deleted image.

Optionally, deleted images in the "Recently Deleted" album may be sorted in chronological order of deletion. The image deleted earlier is sorted higher, while the image deleted later is sorted lower. Such sorting helps the user first see an image to expire in the album, and prevents complete deletion of the image due to untimely restoration.

On the full-size image interface of the "Recently Deleted" album, the electronic device 100 may display shooting information corresponding to a current image, such as a shooting time and a shooting location, and display deleted information corresponding to the image, such as a name of an application deleting the image and a time when the image was deleted.

Further, on the full-size image interface of the "Recently Deleted" album, the user may restore the currently displayed image by tapping a corresponding control, or may completely delete the currently displayed image.

Embodiment 2

In this embodiment, when the user opens the gallery application, the electronic device 100 may notify, through a card notification, the user of the application performing the image deletion operation.

Figure 8:
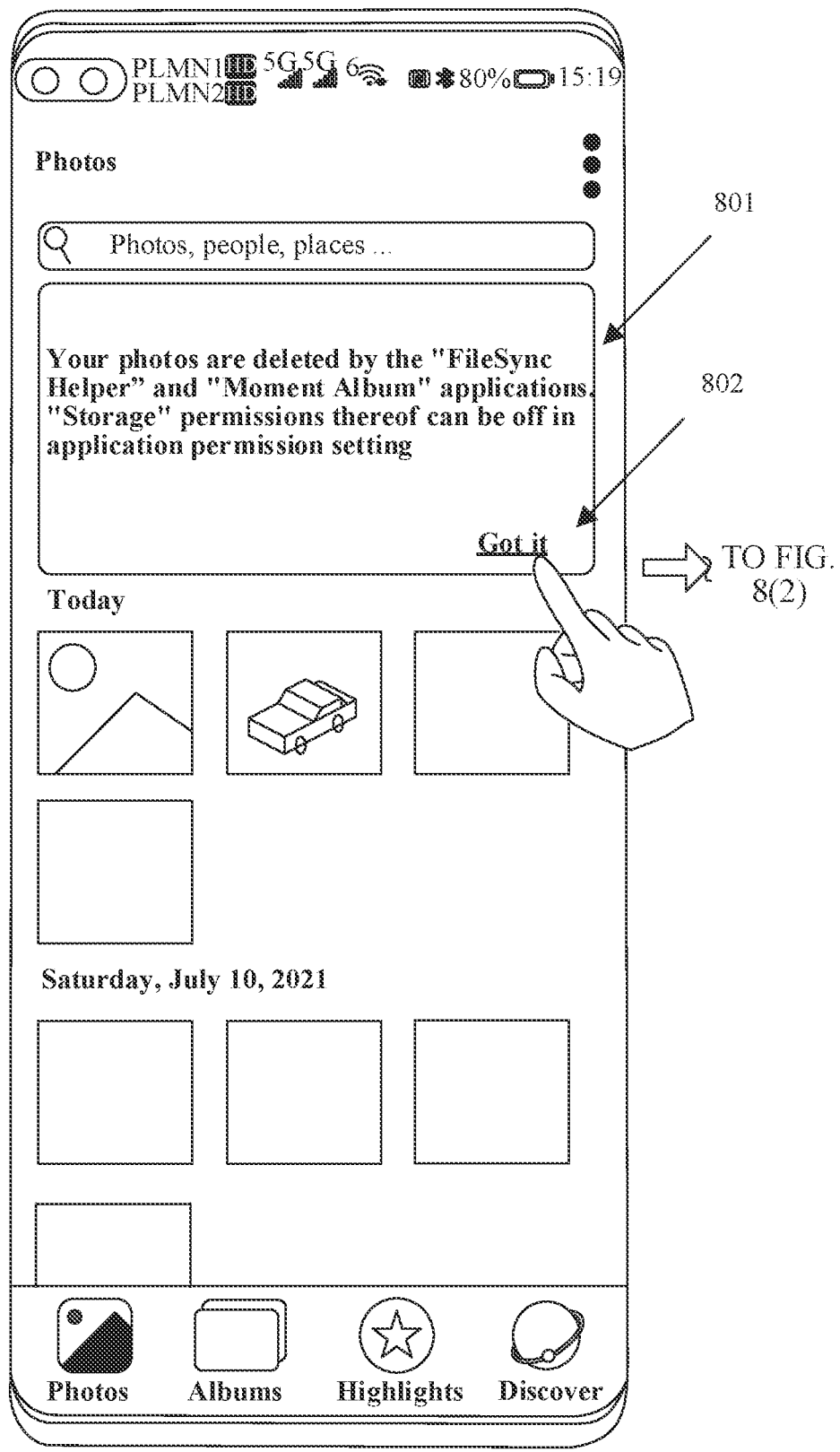
FIG. 8(1) and FIG. 8(2) are a schematic diagram of a display interface of an image deletion card according to an embodiment of this application.
Figure 8:
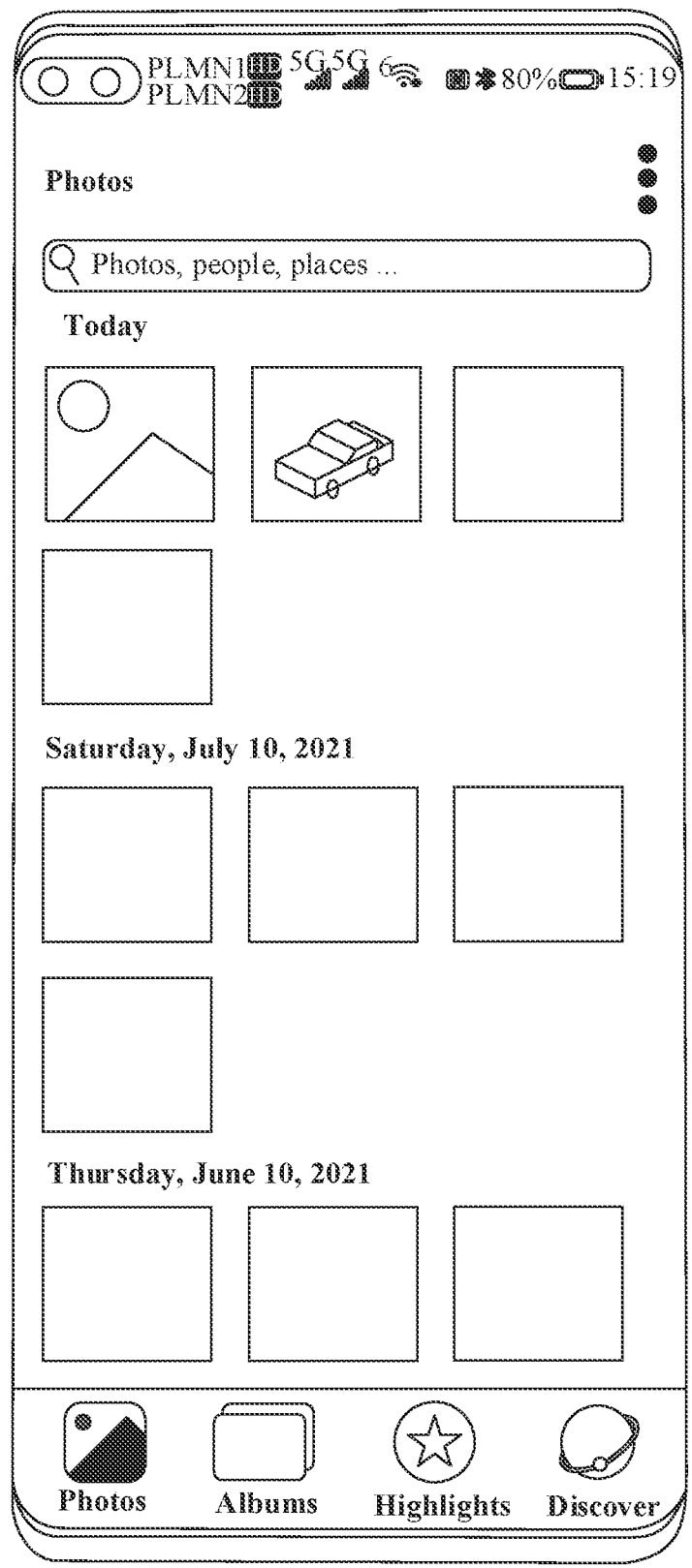

Refer to FIG. 8(1) and FIG. 8(2) which are a schematic diagram of a display interface of an image deletion card according to an embodiment of this application.

As shown in FIG. 8(1) and FIG. 8(2), after the user opens the gallery application of the electronic device 10, the electronic device 100 displays a Photos interface of the gallery application as shown in FIG. 8(1). If the image of the electronic device 100 is deleted by one or more applications other than the gallery application before the gallery application is opened, an image deletion card 801 shown in FIG. 8(1) may be displayed at the top of the Photos interface. Names of a plurality of applications performing image deletion operations are displayed in the image deletion card 801.

Thumbnails of images in the gallery are displayed below the image deletion card 801 in chronological order of obtaining times. The obtaining times herein are times when the electronic device 100 obtained the corresponding images. For an image captured by the electronic device 100, the obtaining time is a shooting time of the image. For an image downloaded by the electronic device 100 from a network or copied from another electronic device, the obtaining time is a time when the electronic device 100 downloaded or copied the image.

Taking FIG. 8(1) as an example, before the user opens the gallery application, some images are deleted by the two applications "FileSync Helper" and "Moment Album". Therefore, when the user opens the gallery application, the electronic device 100 displays the Photos interface, and displays the image deletion card 801 shown in FIG. 8(1) at the top of the Photos interface, so as to notify the user that the images are deleted by the two applications "FileSync Helper" and "Moment Album".

Optionally, the image deletion card may include a card removal button. The specific form of the card removal button is not limited in this embodiment.

As an example, the card removal button may be a button in a form of text, which may be, for example, in a form of a "Got it" button 802 in FIG. 8(1).

The electronic device 100 may remove, in response to an operation of tapping the card removal button by the user, the image deletion card currently displayed in the gallery application.

Referring to FIG. 8(1) and FIG. 8(2) together, when the gallery application is opened, the electronic device 100 displays the image deletion card 801 as shown in FIG. 8(1), the user taps the card removal button (that is, the text "Got it") 802 after seeing the image deletion card 801, the image deletion card is then removed, and the interface displayed by the electronic device 100 switches from FIG. 8(1) to FIG. 8(2).

In some optional embodiments, names of applications that have deleted images recently may be displayed in the image deletion card, which may be, for example, names of applications that have deleted images within the last 48 hours. In other words, each time the user opens the gallery application, if there are applications other than the gallery application that have deleted images within the previous 48 hours, the electronic device 100 may display names of these applications in the image deletion card shown in FIG. 8(1), and if no images have been deleted by the application within the previous 48 hours, the electronic device 100 does not display the image deletion card.

In some optional embodiments, names of applications deleting images between a moment when the gallery application was last opened and a current moment may be displayed in the image deletion card.

Taking FIG. 8(1) as an example, the gallery application was opened on Jul. 14, 2021, and the last time when the gallery application was opened was Jul. 11, 2021. If the electronic device 100 finds that the two applications "FileSync Helper" and "Moment Album" deleted images during this period, when the gallery application was opened on Jul. 14, 2021, the electronic device 100 displayed the image deletion card, including names of the two applications, i.e., "FileSync Helper" and "Moment Album". Conversely, if the applications "FileSync Helper" and "Moment Album" did not delete images between Jul. 11, 2021 and Jul. 14, 2021, the electronic device 100 does not display the image deletion card including the names of the two applications.

Further, the electronic device 100 may also display, in the image deletion card, a method of prohibiting an application from deleting an image. For example, in FIG. 8(1), the image deletion card 801 displays text: "Storage" permissions thereof can be off in application permission settings.

In some optional embodiments, if the electronic device 100 also displayed an image deletion card when the gallery application was last opened and the last image deletion card is not removed by the user through the foregoing card removal button, after the gallery application is opened this time, names of applications deleting images between a moment when the gallery application was last opened and a current moment and names of applications in the image deletion card when the gallery application was last opened may be displayed in the image deletion card.

Figure 9:
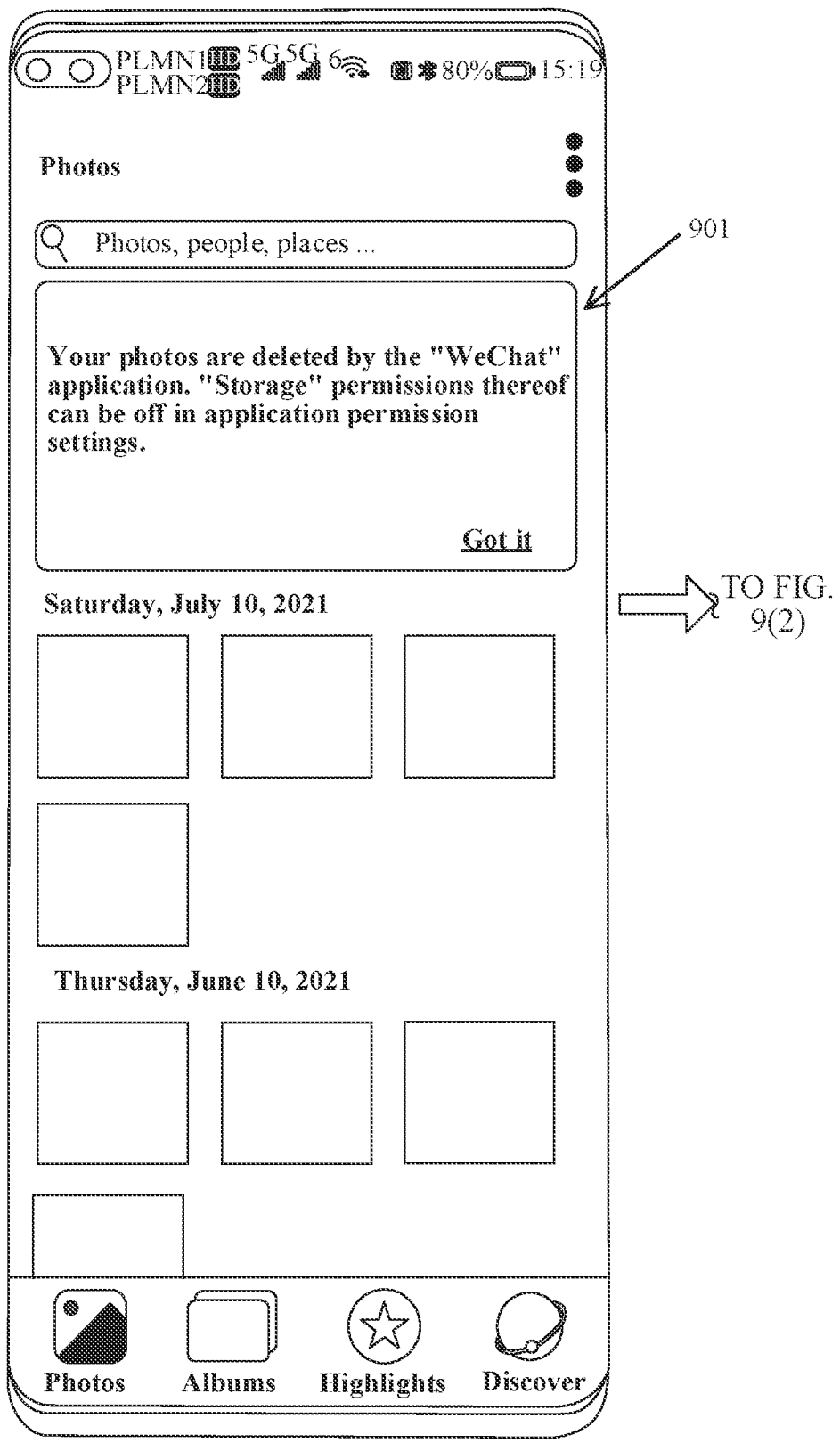
FIG. 9(1) and FIG. 9(2) are a schematic diagram of a display interface of another image deletion card according to an embodiment of this application.
Figure 9:
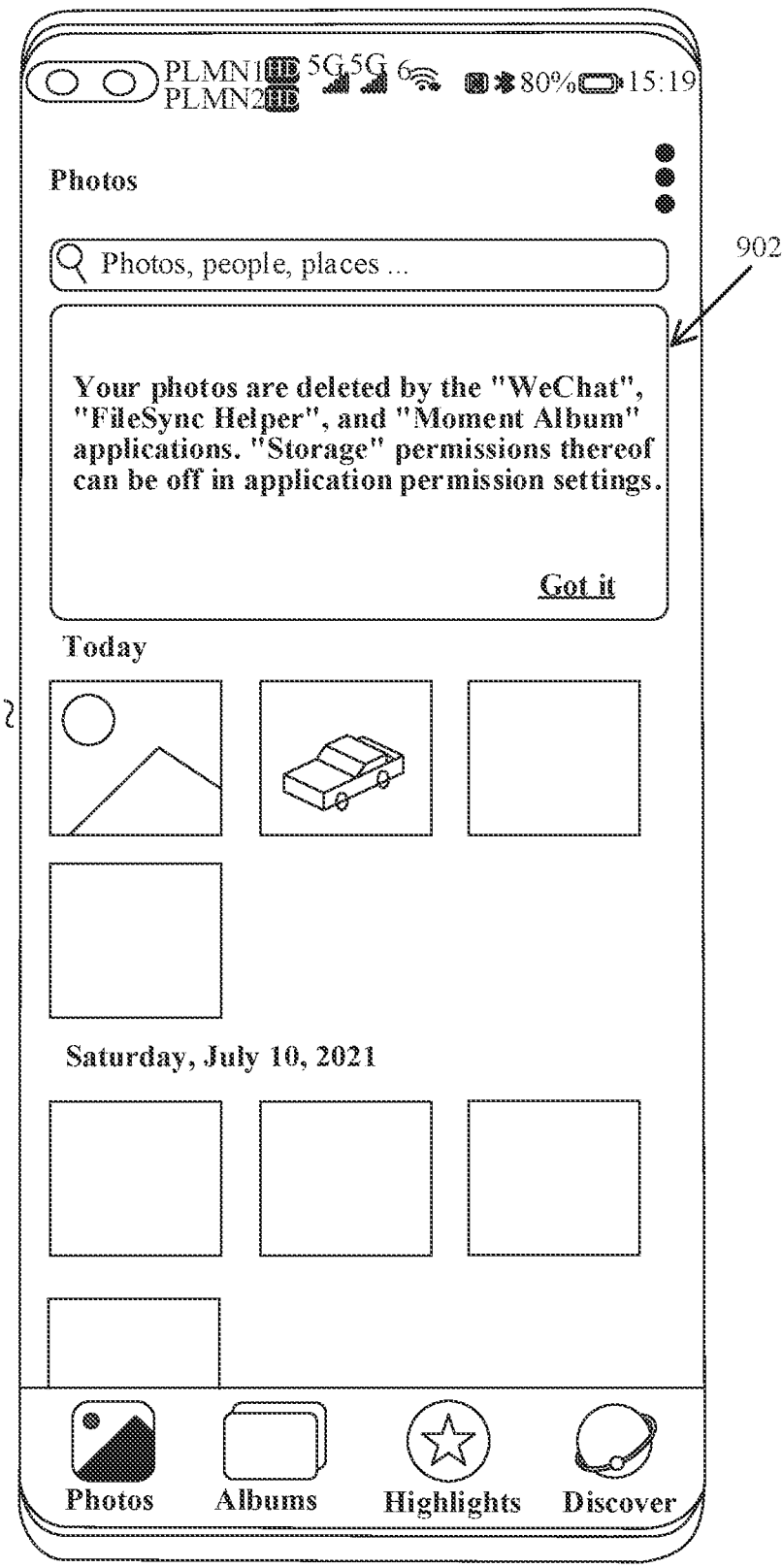

FIG. 9(1) and FIG. 9(2) are taken as an example. Assuming that the gallery application was opened once on Jul. 11, 2021, the electronic device 100 finds that a "WeChat" application has deleted an image before this opening and then displays an image deletion card 901 as shown in FIG. 9(1) after the gallery application is opened, so as to remind the user that the "WeChat" application has deleted the image. After a period of time, the user exits the gallery application and does not tap a "Got it" button of the image deletion card 901.

Afterwards, the gallery application was opened for the second time on July 14. Between July 11 and July 14, the electronic device 100 detected that the two applications "FileSync Helper" and "Moment Album" had deleted images. Then, when the gallery application was opened for the second time, the electronic device 100 displayed an image deletion card 902 as shown in FIG. 9(2), including "FileSync Helper" and "Moment Album" and further including the application in the image deletion card 901 that was last displayed and has not been removed by the user, namely "WeChat".

In other words, the electronic device 100, when finding that an application deletes an image, may always display a name of the application in an image deletion card until the image deletion card including the name of the application name is manually removed by the user (that is, removed by tapping the card removal button).

If the image deletion card was removed after the gallery application was last opened, after the gallery application is opened for the second time, only names of applications deleting images during a moment when the image deletion card was last removed and a current moment are displayed in the image deletion card.

With reference to the example in FIG. 9(1) and FIG. 9(2), if the image deletion card 901 displayed was removed after the gallery application was opened on Jul. 11, 2021, when the gallery application was opened for the second time on July 14, the electronic device 100 displayed, in the image deletion card 902, only names of applications deleting images between July 11 and July 14, i.e., "FileSync Helper" and "Moment Album", and no longer displayed the name of the application "WeChat" in the first image deletion card 901.

An advantage of this is to ensure that the user can be notified of an image deletion operation performed by an application, preventing untimely restoration of a deleted image by the user due to ignoring of an prompt in the image deletion card.

Optionally, the image deletion card 801 shown in FIG. 8(1) may be fixedly displayed at the top of the Photos interface and does not move as the user swipes up and down. That is, the image deletion card is always displayed at the top of the Photos interface when the user swipes up and down on the Photos interface. Alternatively, the image deletion card may appear or disappear as the user swipes up and down.

Optionally, the image deletion card may alternatively be displayed at the top of a Photos page in a floating manner. That is, the image deletion card may appear or disappear as the user swipes up and down.

Figure 10:
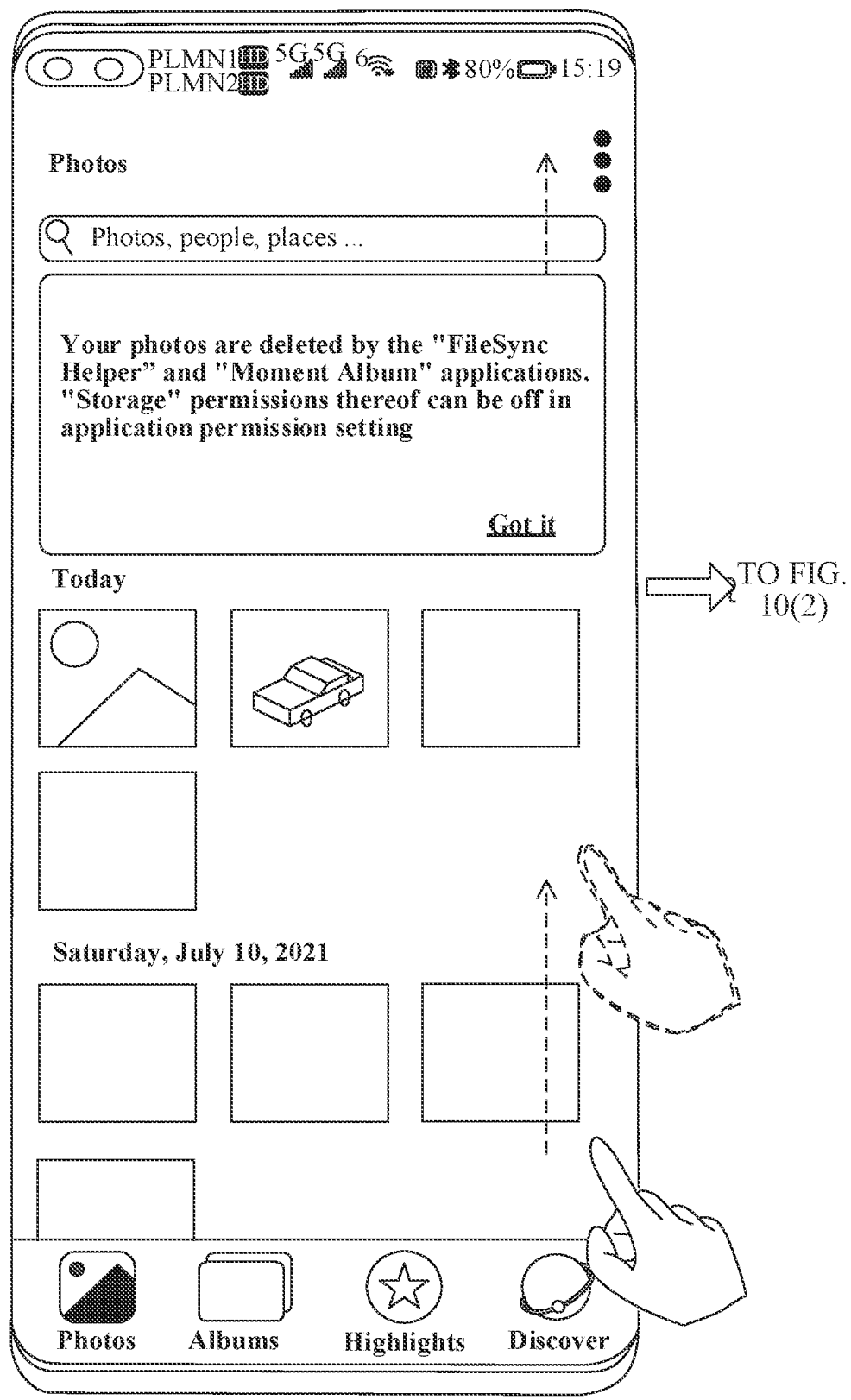
FIG. 10(1) and FIG. 10(2) are a schematic diagram of a display interface of yet another image deletion card according to an embodiment of this application.
Figure 10:
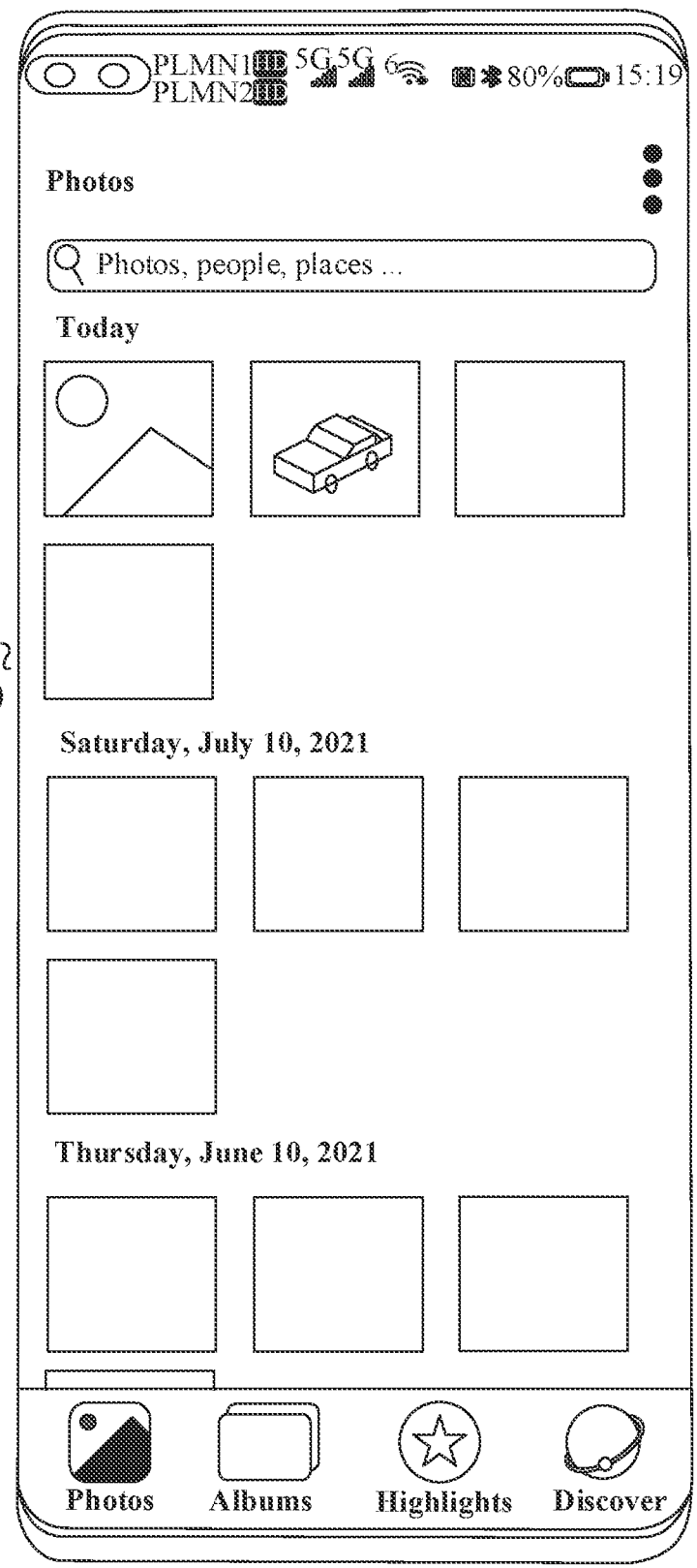

Taking FIG. 10(1) and FIG. 10(2) as an example, when the gallery application is opened, the electronic device 100 displays an interface shown in FIG. 10(1), and there is an image deletion card at the top of the interface. When the user slides upward on the interface shown in FIG. 10(1), the image deletion card moves upward as the user swipes until the image deletion card disappears. In this case, an interface as shown in FIG. 10(2) is displayed on the display screen of the electronic device 100.

The appearance or disappearance of the image deletion card as the user swipes has the following beneficial effects:

A larger display region is provided after the user swipes, enabling the user to browse thumbnails of more images.

The gallery application of the electronic device 100 may include a plurality of interfaces. Taking FIG. 10(1) and FIG. 10(2) as an example, the gallery application includes four tabs: Photos, Albums, Highlights, and Discover, and each tab corresponds to an interface. The user may switch between different interfaces of the gallery application by tapping the corresponding tabs.

In this embodiment, the image deletion card may be displayed on only one of the above plurality of interfaces that is most frequently browsed, while the image deletion card is not displayed on other interfaces of the gallery application. Taking FIG. 8(1) and FIG. 8(2) as an example, assuming that the Photos interface is the most frequently browsed interface when the user opens the gallery application, the image deletion card is only displayed on the Photos interface, and when the user switches to other interfaces such as Albums, Highlights, and Discover, the electronic device 100 does not display the image deletion card.

The display of the image deletion card only on the most frequently browsed interface has the following advantages:

The user is more likely to see the image deletion card, thereby notifying the user of image deletion operation of the application, and interference with the normal use of the gallery application by the user due to frequent display of the image deletion card can also be prevented.

In another optional embodiment, the electronic device 100 may alternatively display the image deletion card at the top of each interface of the gallery application.

Figure 11:
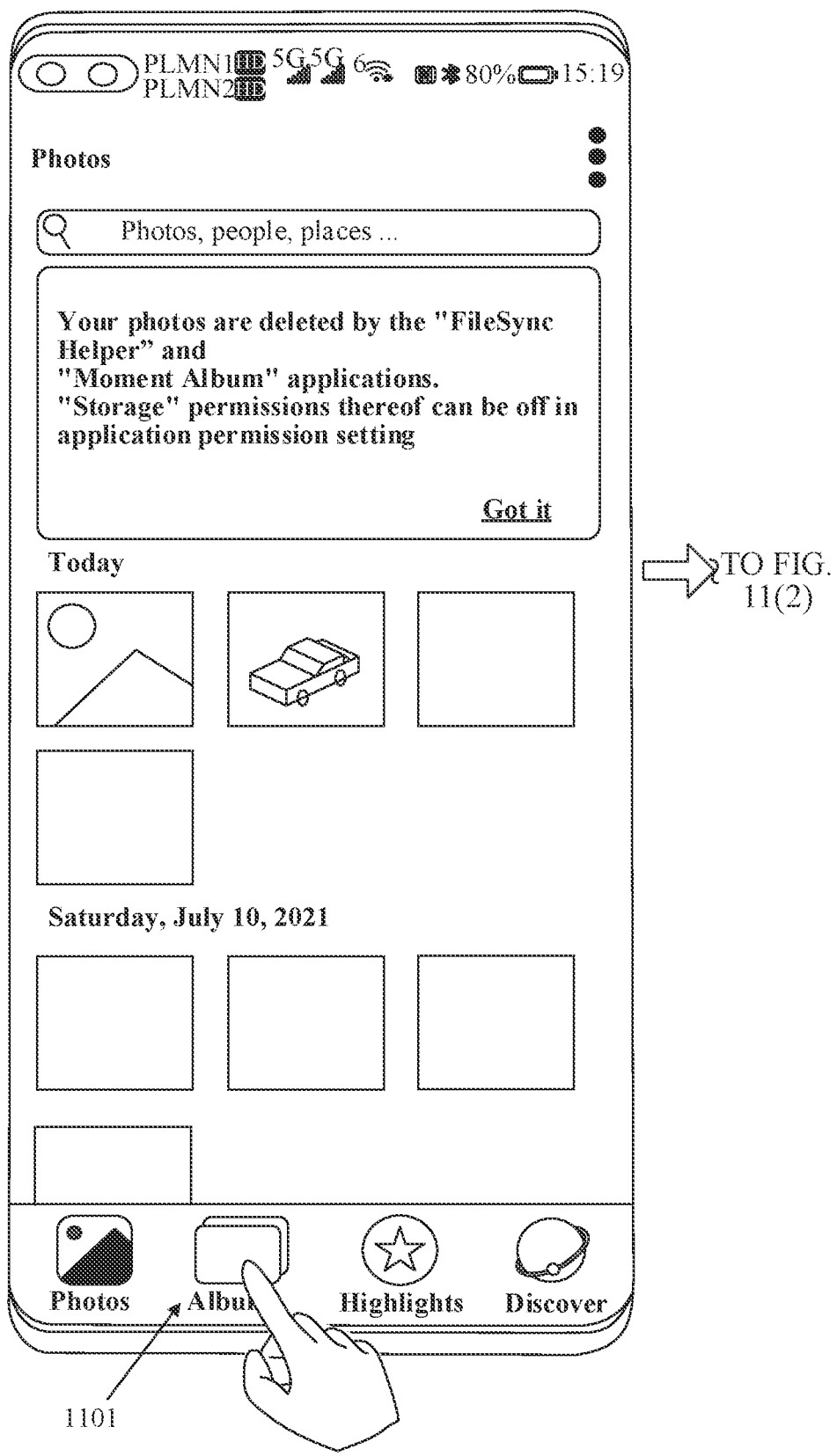
FIG. 11(1) and FIG. 11(2) are a schematic diagram of a display interface of still another image deletion card according to an embodiment of this application.
Figure 11:
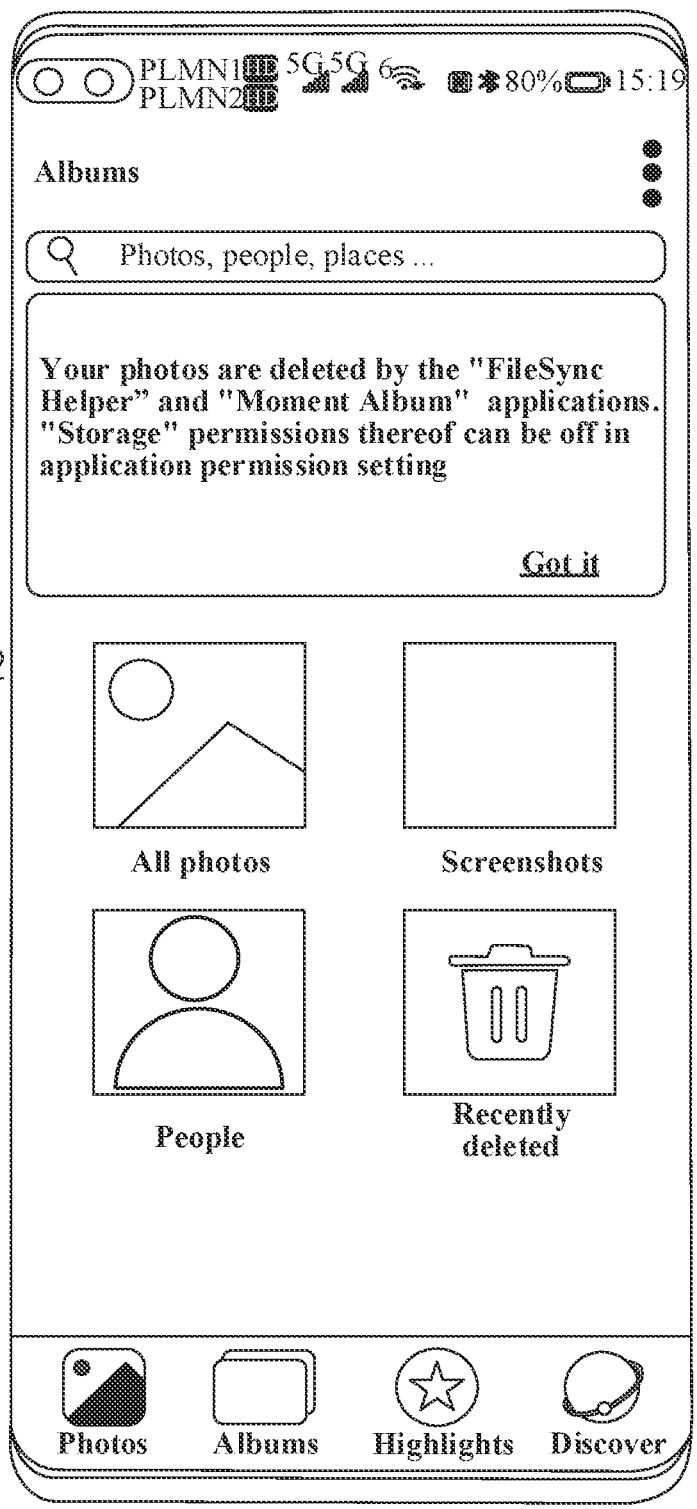

Taking FIG. 11(1) and FIG. 11(2) as an example, when the gallery application is opened, a Photos interface shown in FIG. 11(1) is first displayed, and an image deletion card is displayed at the top of the Photos interface. After the user taps a tab 1101 corresponding to the Albums interface, the interface displayed by the electronic device 100 is switched to an Albums interface of the gallery application as shown in FIG. 11(2). As can be seen, after the switching to the Albums interface, a same image deletion card as the Photos interface is still displayed at the top of the Albums interface.

The display of the image deletion card on all the interfaces of the gallery application has the following advantages:

The image deletion card is shown to the user as much as possible, so as to ensure that, after the user opens the gallery, the user can be notified, through the image deletion card, of the image deletion operation performed by the application.

It should be noted that, when the image deletion card is displayed on all the interfaces of the gallery application at the same time, if the user removes the image deletion card from any interface, the electronic device 100 synchronously removes the image deletion card from other interfaces of the gallery application.

Exemplarily, the user, when browsing the Albums interface, removes the image deletion card from the Albums interface, and then the electronic device 100 synchronously removes the image deletion card from the Discover, Photos, and Highlights interfaces. When the electronic device 100 switches from the Albums interface to the Photos interface in response to a user operation, the image deletion card is no longer displayed on the Photos interface.

In some other optional embodiments, the electronic device 100 may alternatively display the image deletion card on an interface first displayed when the gallery application is opened, and not display the image deletion card on other interfaces of the gallery application.

Exemplarily, if the Photos interface of the gallery application is first displayed when the user opens the gallery application, the electronic device 100 displays the image deletion card on the Photos interface. When the user switches from the Photos interface to another interface, such as switches to the Albums interface, the electronic device 100 no longer displays the image deletion card. Exemplarily, if the Albums interface of the gallery application is first displayed when the user opens the gallery application, the electronic device 100 displays the image deletion card on the Albums interface. When the user switches from the Albums interface to another interface, such as switches to the Discover interface, the electronic device 100 no longer displays the image deletion card.

An advantage of this embodiment is to ensure that the user can definitely see the image deletion card after opening the gallery application, and interference with the normal use of the user due to display of the image deletion card on a plurality of images can be prevented at the same time.

Optionally, if the electronic device 100 is configured with the foregoing application whitelist, a name of an application deleting an image other than a whitelist application may be displayed in the image deletion card. In other words, if an application deleting an image belongs to the application whitelist, a name of the application may not be displayed in the image deletion card.

Correspondingly, if an application included in the image deletion card is manually added to the application whitelist by the user, the electronic device 100 may remove the application from the image deletion card.

In some optional embodiments, the electronic device 100 may alternatively remove the name of the application from the image deletion card in the following scenarios:

When an unprompt button of an image deletion banner corresponding to an application is tapped by the user, that is, when an application is specified by the user not to prompt again, the electronic device 100 removes the application from the image deletion card.

Figure 12:
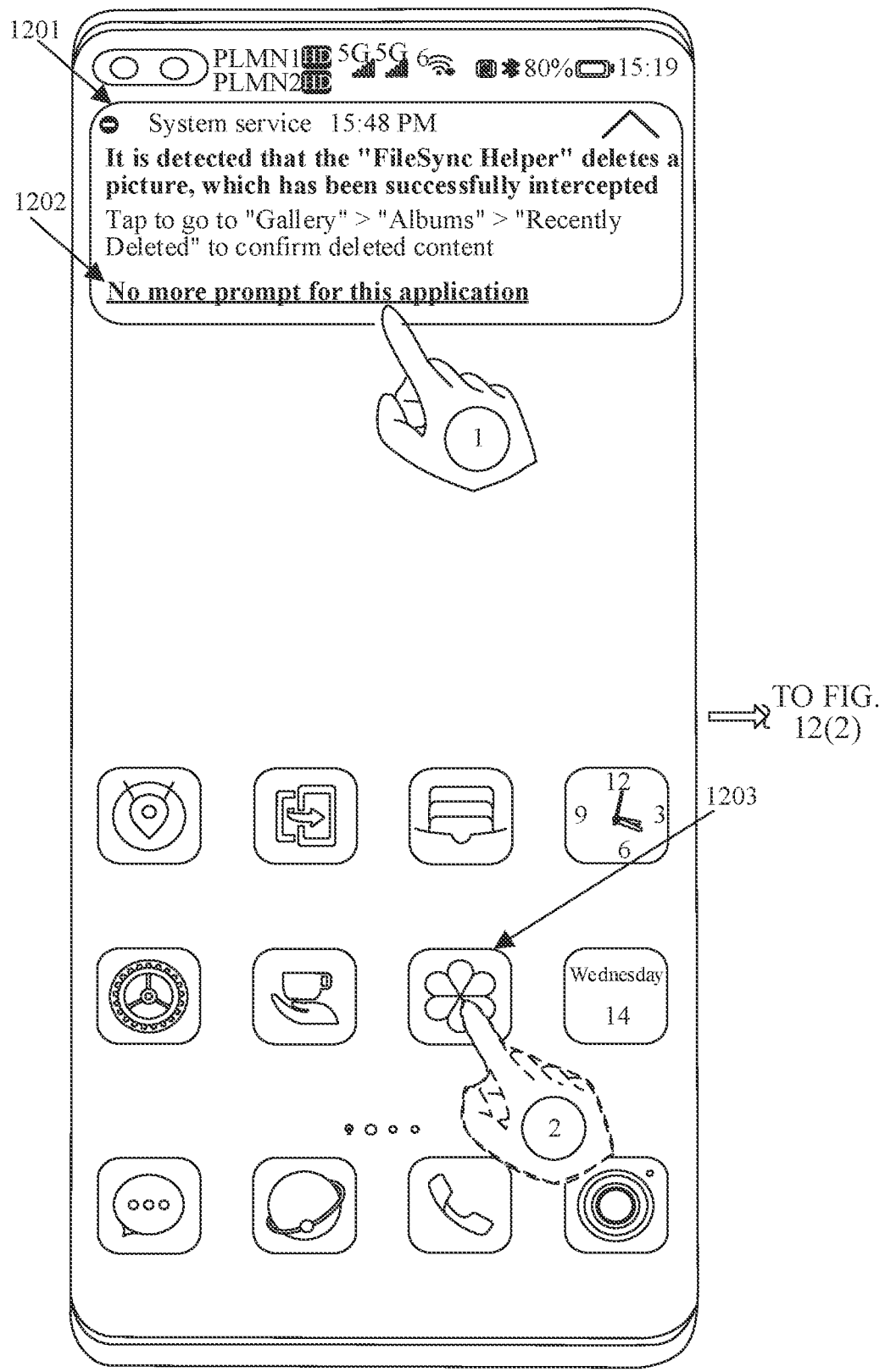
FIG. 12(1) and FIG. 12(2) are a schematic diagram of changes in display content of an image deletion card according to an embodiment of this application.
Figure 12:
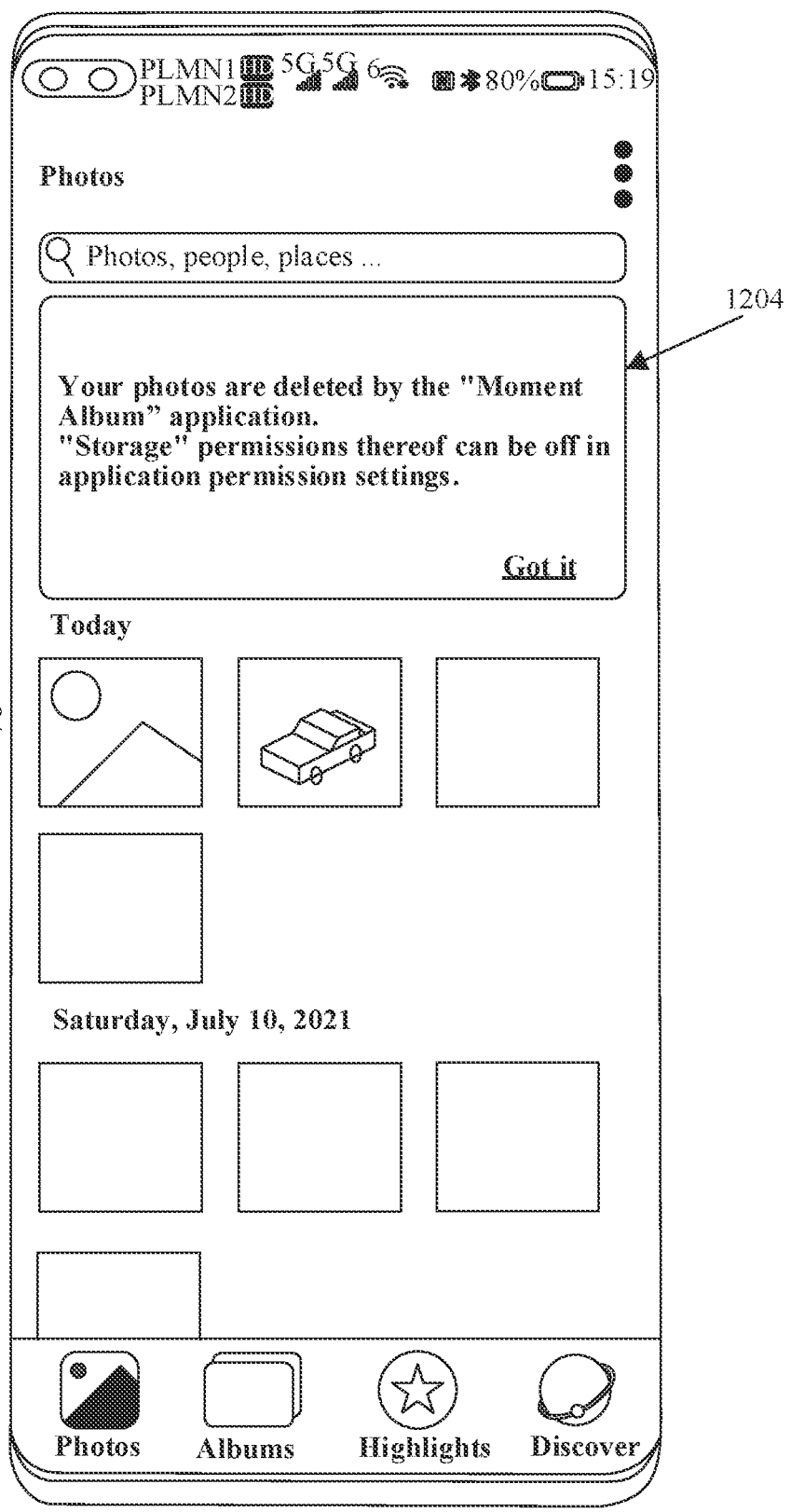

Refer to FIG. 8(1), FIG. 8(2), FIG. 12(1), and FIG. 12(2). When the user opens the gallery application for the first time today, the electronic device 100 displays the interface as shown in FIG. 8(1), and the image deletion card 801 in the interface prompts the user that images are deleted by the applications "FileSync Helper" and "Moment Album".

After browsing images in the gallery application, the user exits the gallery application, and the electronic device 100 returns to the desktop from the gallery application. In this case, the electronic device 100 finds that the "FileSync Helper" deletes another image. Referring to FIG. 12(1), an image deletion banner 1201 corresponding to the "FileSync Helper" pops up on the electronic device 100 to prompt the user that an image is deleted by the "FileSync Helper".

Then, the user taps an unprompt button 1202 in the image deletion banner 1201. Then, the user taps an icon 1203 of the gallery application on the desktop to open the gallery application for the second time, and the electronic device 100 switches from the desktop shown in FIG. 12(1) to a Photos interface of the gallery application shown in FIG. 12(2).

As can be seen, when the gallery application is opened for the second time, an image deletion card 1204 in FIG. 12(2) only includes the "Moment Album" because the "FileSync Helper" has been specified by the user not to prompt again.

Further, if the "Moment Album" is also specified by the user not to prompt again when the gallery application is opened for the second time, the electronic device 100 may no longer display the image deletion card because there is no application that needs to be prompted through the image deletion card.

It may be understood that, when the user taps an unprompt button of an image deletion banner corresponding to an application in the message notification bar, the electronic device 100 may also remove a name of the application from the image deletion card, and the corresponding scenario is similar to that in FIG. 12(1) and FIG. 12(2). Details are not described again.

Further optionally, the electronic device 100 may alternatively remove the name of the application from the image deletion card in the following scenarios:

Generally, notification banners popping up at the top of the display screen and displayed in the message notification bar can be removed one by one by the user through a horizontal swiping operation (leftward swiping or rightward swiping). In this embodiment, when the image deletion banner corresponding to the application is removed by the user through the horizontal swiping operation, the electronic device 100 may remove the name of the application from the image deletion card.

Figure 13:
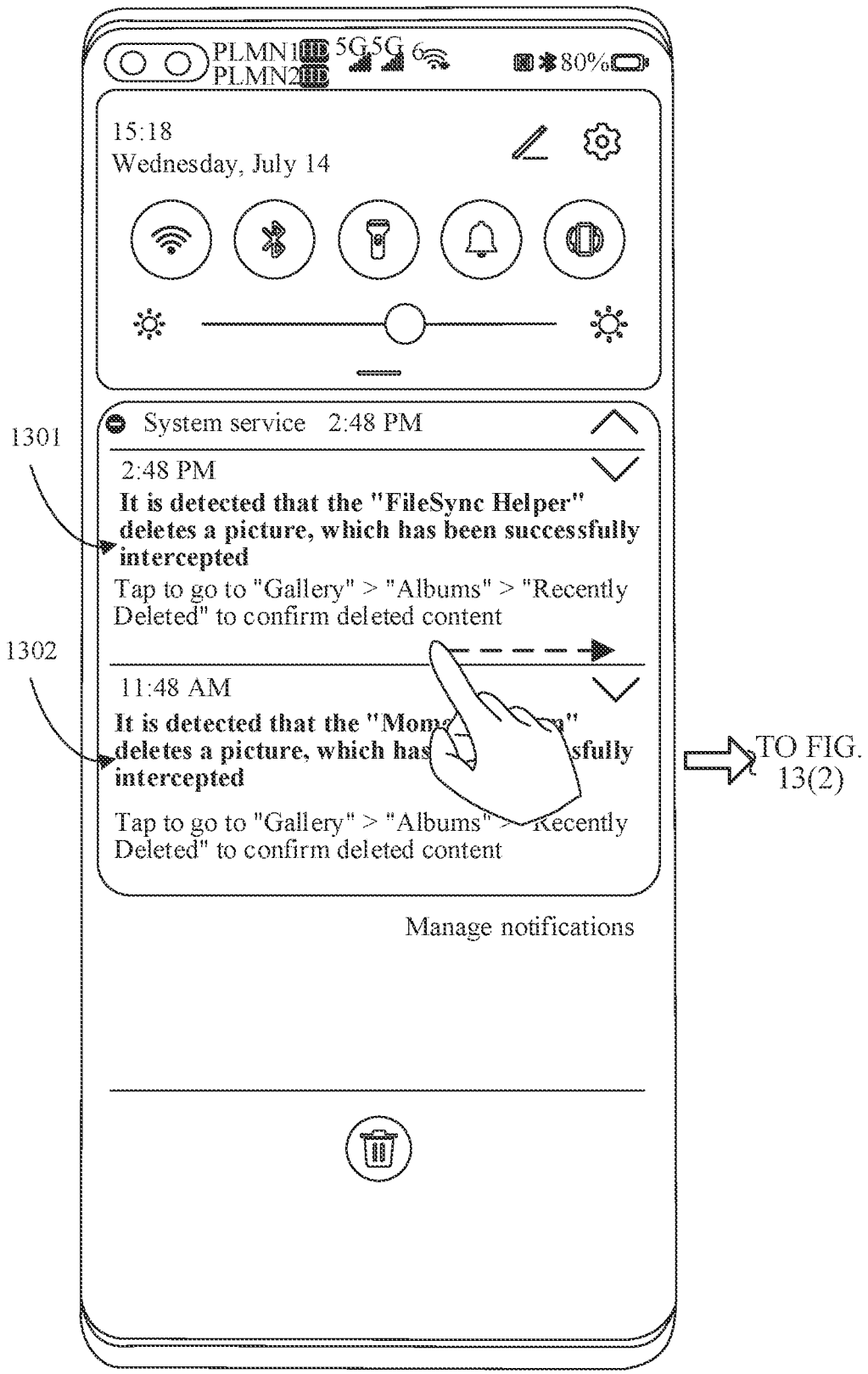
FIG. 13(1) and FIG. 13(2) are a schematic diagram of changes in display content of another image deletion card according to an embodiment of this application.
Figure 13:
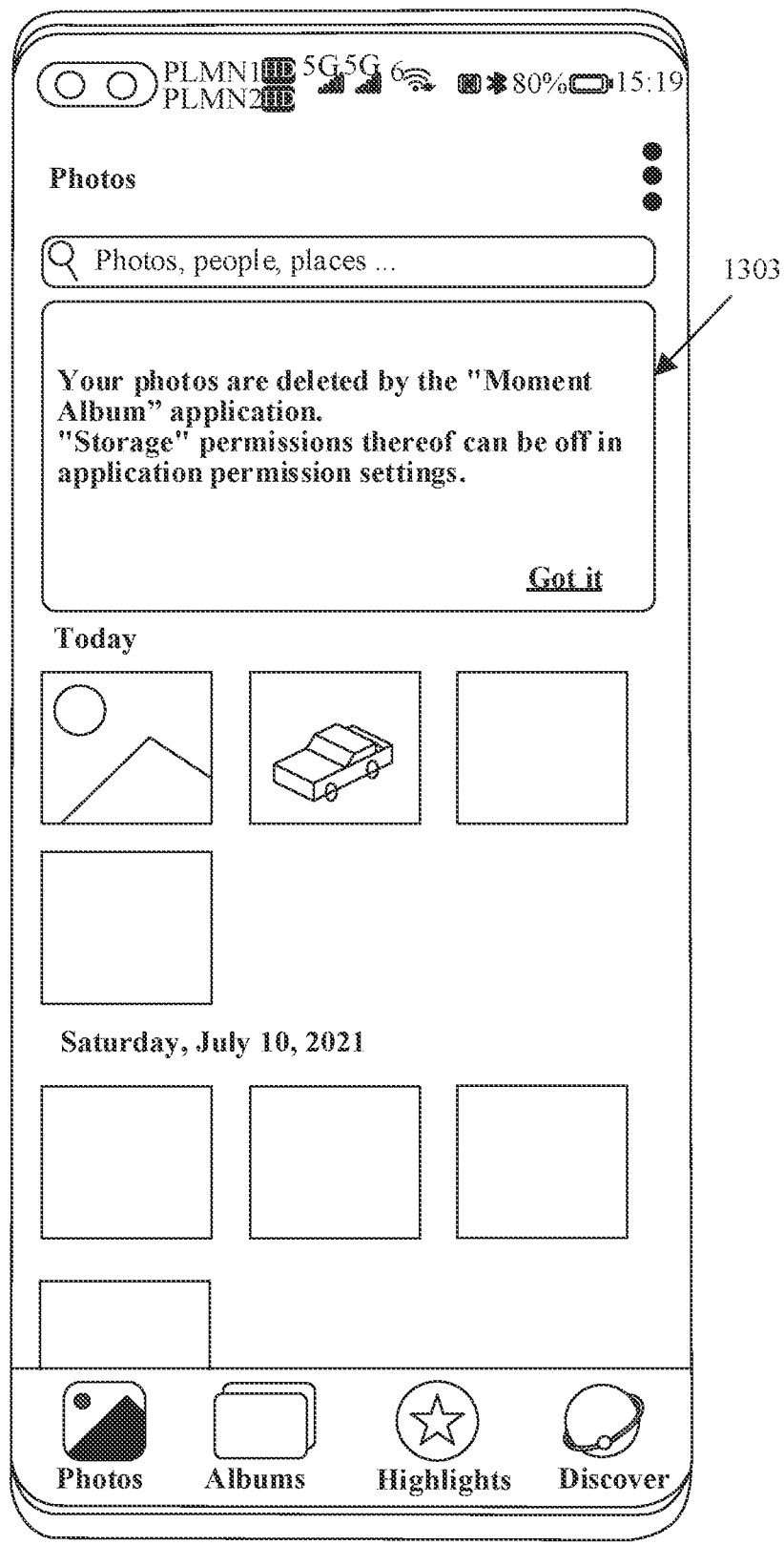

Refer to FIG. 8(1), FIG. 8(2), FIG. 13(1), and FIG. 13(2). When the user opens the gallery application for the first time today, the electronic device 100 displays the interface as shown in FIG. 8(1), and the image deletion card 801 in the interface prompts the user that images are deleted by the applications "FileSync Helper" and "Moment Album".

After the exiting from the gallery application, the electronic device 100 displays, in response to a pull-down operation of the user, a message notification bar as shown in FIG. 13(1). As can be seen, the message notification bar includes an image deletion banner 1301 corresponding to the "FileSync Helper" and an image deletion banner 1302 corresponding to the "Moment Album".

Then, the electronic device 100 removes the image deletion banner 1301 from the message notification bar in response to an operation of swiping the image deletion banner 1301 rightward by the user.

After the image deletion banner 1301 is removed from the message notification bar, the gallery application is opened again, and the electronic device 100 displays a Photos interface of the gallery application as shown in FIG. 13(2). As can be seen, in this case, an image deletion card 1303 displayed by the electronic device 100 does not include the "FileSync Helper" corresponding to the removed image deletion banner 1301. That is, after the image deletion banner 1301 is removed, the electronic device 100 simultaneously removes the "FileSync Helper" from the image deletion card.

The cancellation of the name of the corresponding application in the image deletion card after the image deletion banner is removed has the following beneficial effects:

After the user removes the image deletion banner by tapping the unprompt button or through a horizontal swiping operation, it may be considered that the user already knows the image deletion operation performed by the corresponding application. In this case, the deletion of the name of the corresponding application from the image deletion card can prevent interference with normal use due to repeated prompting of the user for a same application, and can also prevent a misunderstanding that the application performs an image deletion operation again.

It should be noted that, if the user deletes an image deletion banner corresponding to an application through a rightward swiping operation and the application deletes another image, the electronic device 100 may also display a name of the application in the image deletion card.

When there are too many notification banners displayed in the message notification bar, the user may ignore specific content of the notification banners and tap a clear button at the bottom of the message notification bar to clear all the notification banners in the message notification bar in batches. It may be understood that, in this case, there is a high probability that the image deletion operation performed by the application is not understood by the user. Therefore, when the image deletion banners in the message notification bar are removed by batch clearing, the electronic device 100 retains names of corresponding applications in the image deletion card.

In this way, the following beneficial effects are achieved. Ignoring of the image deletion operation performed by the application by the user due to batch clearing of the image deletion banners is prevented, and a probability of notifying the user of the image deletion operation of the application is increased.

Figure 14:
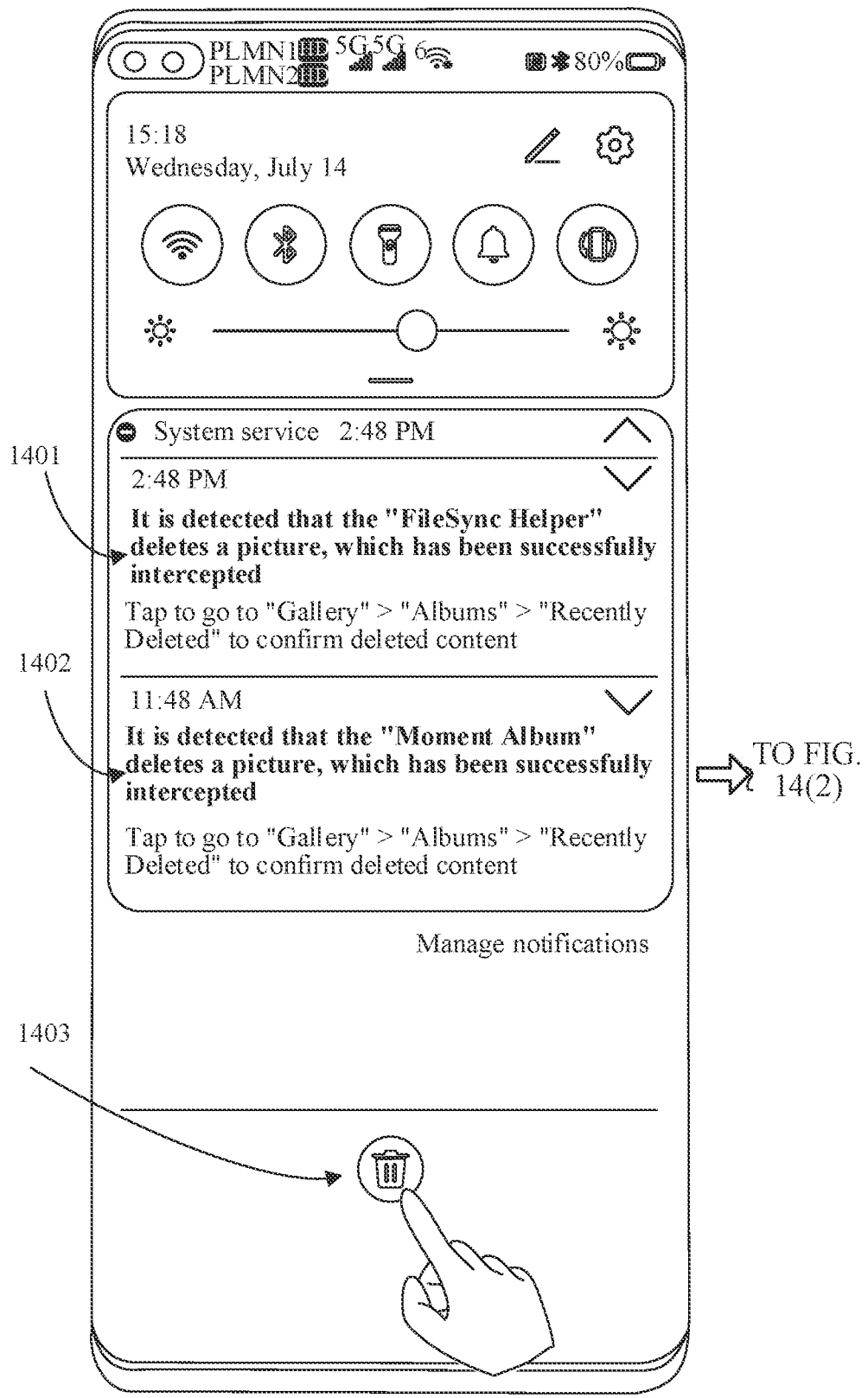
FIG. 14(1) and FIG. 14(2) are a schematic diagram of changes in display content of yet another image deletion card according to an embodiment of this application.
Figure 14:
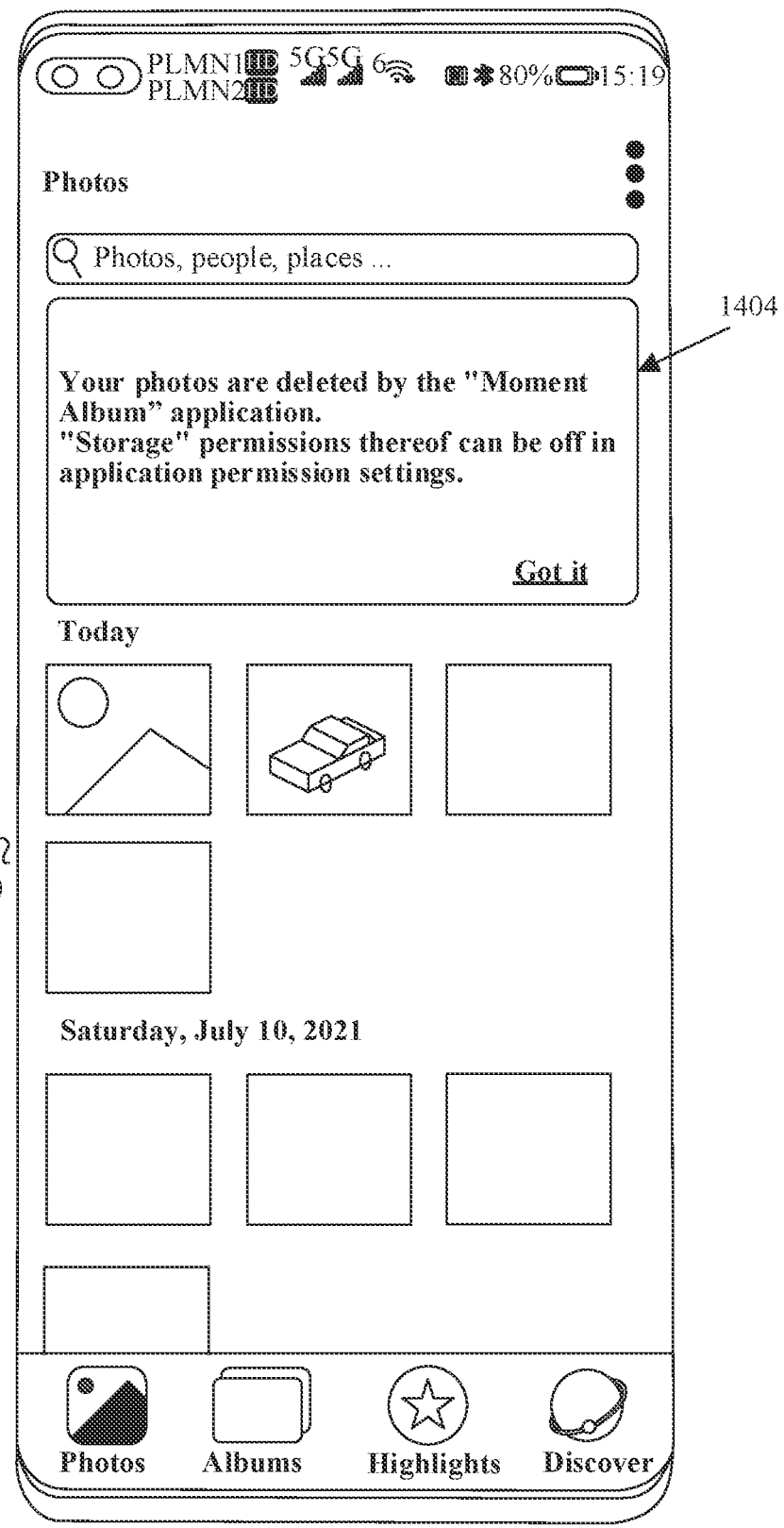

Refer to FIG. 8(1), FIG. 8(2), FIG. 14(1), and FIG. 14(2). When the user opens the gallery application for the first time today, the electronic device 100 displays the interface as shown in FIG. 8(1), and the image deletion card 801 in the interface prompts the user that images are deleted by the applications "FileSync Helper" and "Moment Album".

After the exiting from the gallery application, the electronic device 100 displays, in response to a pull-down operation of the user, a message notification bar as shown in FIG. 14(1). As can be seen, the message notification bar includes an image deletion banner 14401 corresponding to the "FileSync Helper" and an image deletion banner 1402 corresponding to the "Moment Album".

Then, the electronic device 100 clears, in response to an operation of tapping a clear button 1403 at the bottom of the message notification bar by the user, all notification banners displayed in the message notification bar in batches, that is, removes the image deletion banners 1401 and 1402 at the same time.

Then, when the gallery application is opened again, the electronic device 100 displays an interface as shown in FIG. 14(2). As can be seen, content in the image deletion card may not be affected after the image deletion banners are cleared in batches, and content of an image deletion card 1404 shown in FIG. 14(2) is the same as that of the image deletion card 801 shown in FIG. 8(1), both including a prompt that images are deleted by the "FileSync Helper" and the "Moment Album".

It should be noted that the image deletion card includes at least names of applications deleting images other than the gallery application, such as the "FileSync Helper" and the "Moment Album". In addition to the names of the applications deleting images, the electronic device 100 may display a variety of different texts in the image deletion card according to an actual situation. Text content other than the names of the applications in the image deletion card is not limited in this embodiment. The text in the image deletion card shown in the above drawings of this embodiment is only an optional example.

Embodiment 3

In this embodiment, the electronic device 100 may display the corresponding Albums interface after the user opens the Albums tab of the gallery application. The Albums interface may include a "Recently Deleted" album. After the electronic 100 opens the "Recently Deleted" album, images deleted by the third-party applications and the system applications will be displayed in partitions (that is, displayed in different regions), so that the user can browse and restore the images deleted by the third-party applications.

The system applications may be understood as applications that come with an operating system of the electronic device 100. For example, the gallery application, a call application, and an AppGallery may be regarded as the system applications of the electronic device 100. The third-party applications may be understood as applications other than the system applications of the electronic device 100, or applications installed through the AppGallery or other channels when the user uses the electronic device 100.

In some optional embodiments, when the user adds a third-party application to the application whitelist through the unprompt button (that is, "No more prompt for this application") in the image deletion banner in Embodiment 1 or in another manner, the application may also be regarded as a system application. An image deleted by the application is displayed in a partition corresponding to the system application, but not in a partition corresponding to the third-party application.

The electronic device 100 may display images deleted by the third-party applications and the system applications in partitions in a variety of manners. The specific partition manner is not limited in this embodiment.

Figure 15:
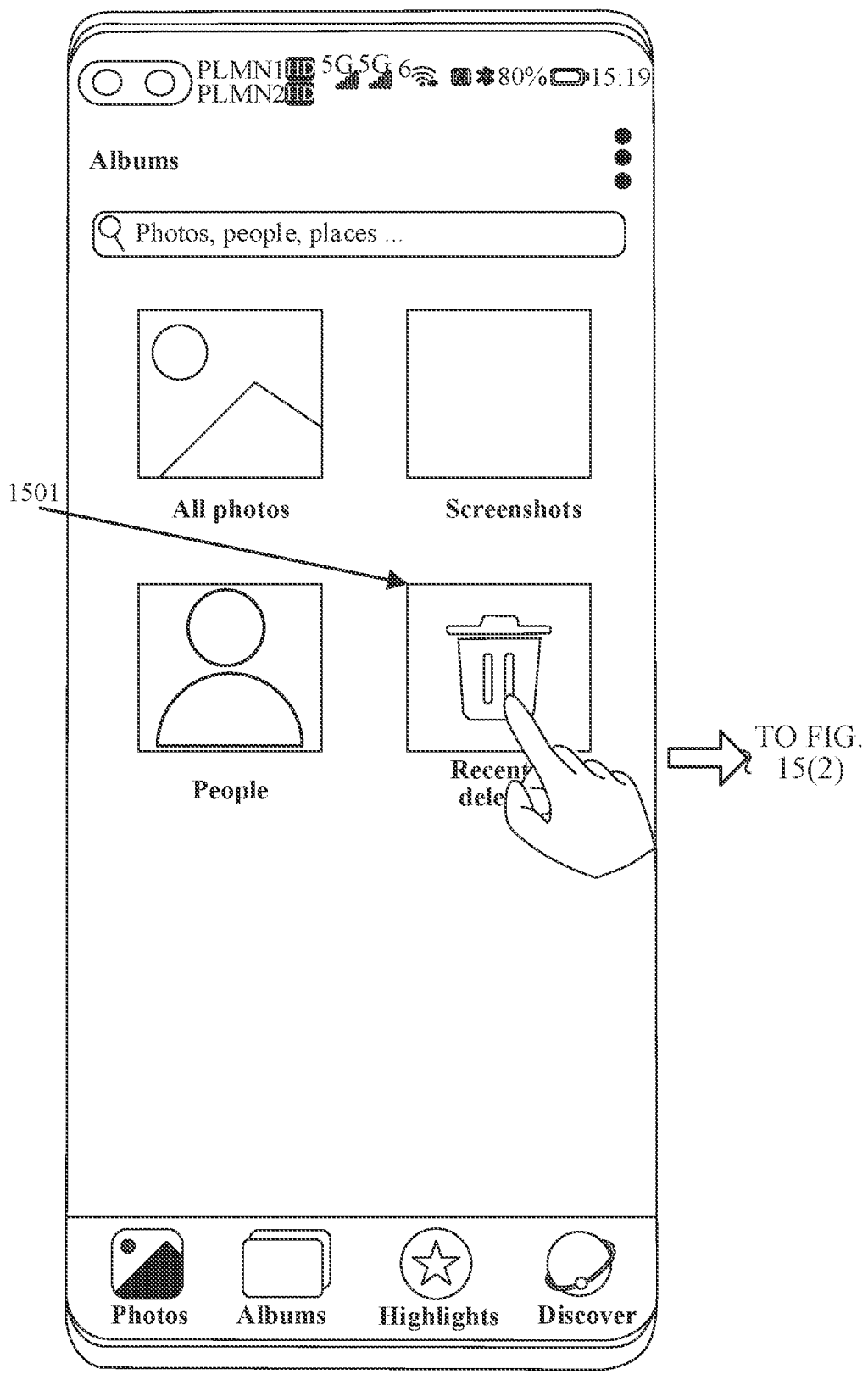
FIG. 15(1) and FIG. 15(2) are a schematic diagram of a browsing interface of a Recently Deleted album according to an embodiment of this application.
Figure 15:
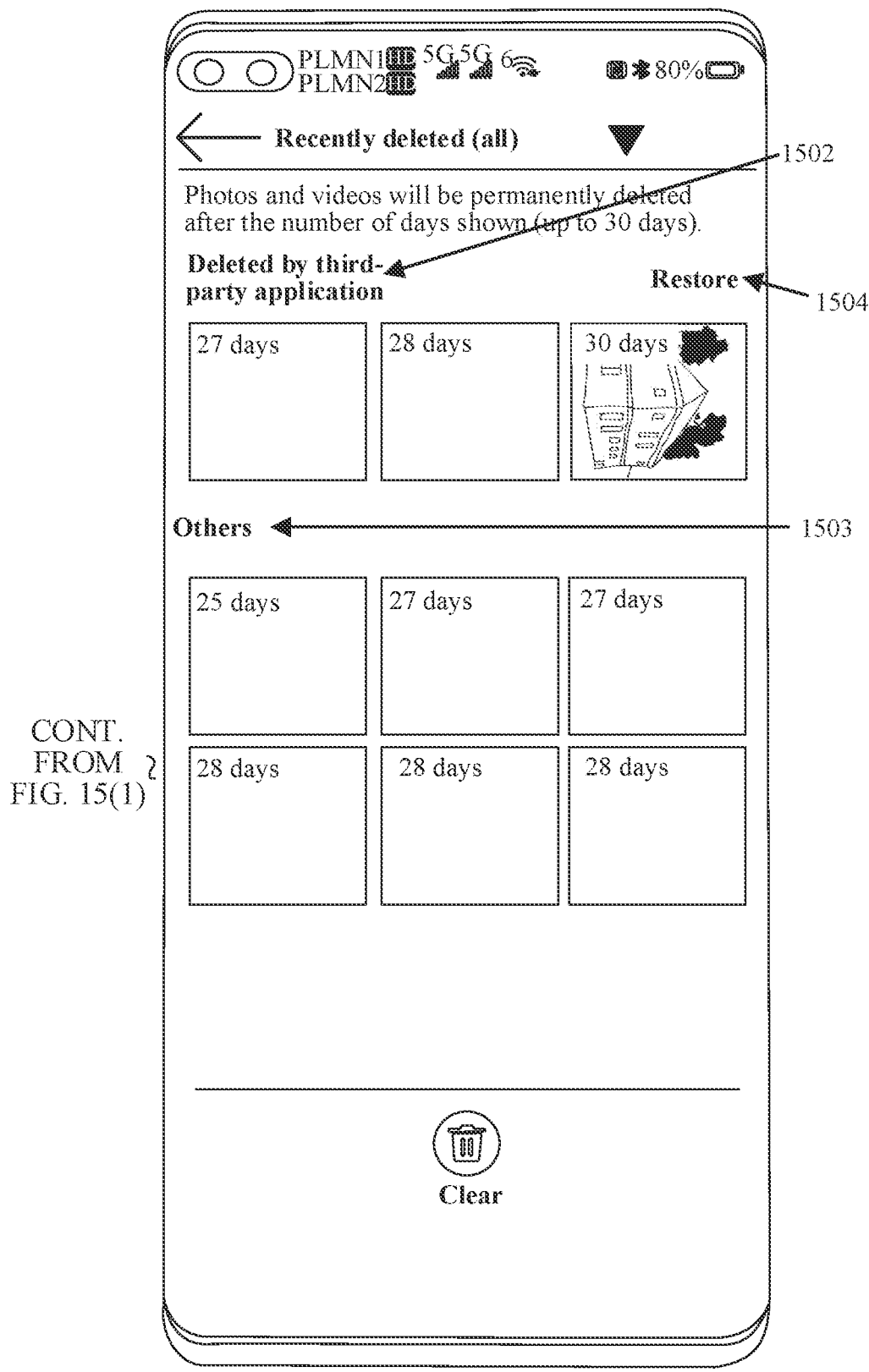

As an example, referring to FIG. 15(1) and FIG. 15(2), in response to an operation of the user, the electronic device 100 opens an Albums interface as shown in FIG. 15(1). In the Albums interface, the user may tap a Recently Deleted album 1501 shown in FIG. 15(1). Then, the electronic device 100 opens the Recently Deleted album, and displays a browsing interface of the Recently Deleted album as shown in FIG. 15(2). The browsing interface includes thumbnails of images recently deleted.

As can be seen, in the browsing interface of the Recently Deleted album, the deleted images are displayed at the top and the bottom of the interface respectively depending on different applications performing deletion operations. In other words, in this example, after opening the browsing interface of the Recently Deleted album, the electronic device 100 displays the thumbnails of the images deleted by the third-party applications at the top of the interface, and after all the thumbnails of the images deleted by the third-party applications are displayed, displays the thumbnails of the images deleted by the system application at the bottom, and uses titles to indicate different partitions at the same time. For example, a region below a "Deleted by third-party application" title 1502 in FIG. 15(2) is used for displaying the thumbnails of the images deleted by the third-party applications, and a region below an "Others" title 1503 is used for displaying the thumbnails of the images deleted by the system applications.

Further, as shown in FIG. 15(2), to facilitate the user to restore the images deleted by the third-party applications, there is also a "Restore" button 1504 on the right of the "Deleted by third-party application" title in the browsing interface. After the user taps the "Restore" button, the electronic device 100 restores restores all the images deleted by the third-party applications in the Recently Deleted album, and continuously retains the images deleted by the system applications in the Recently Deleted album.

Figure 16:
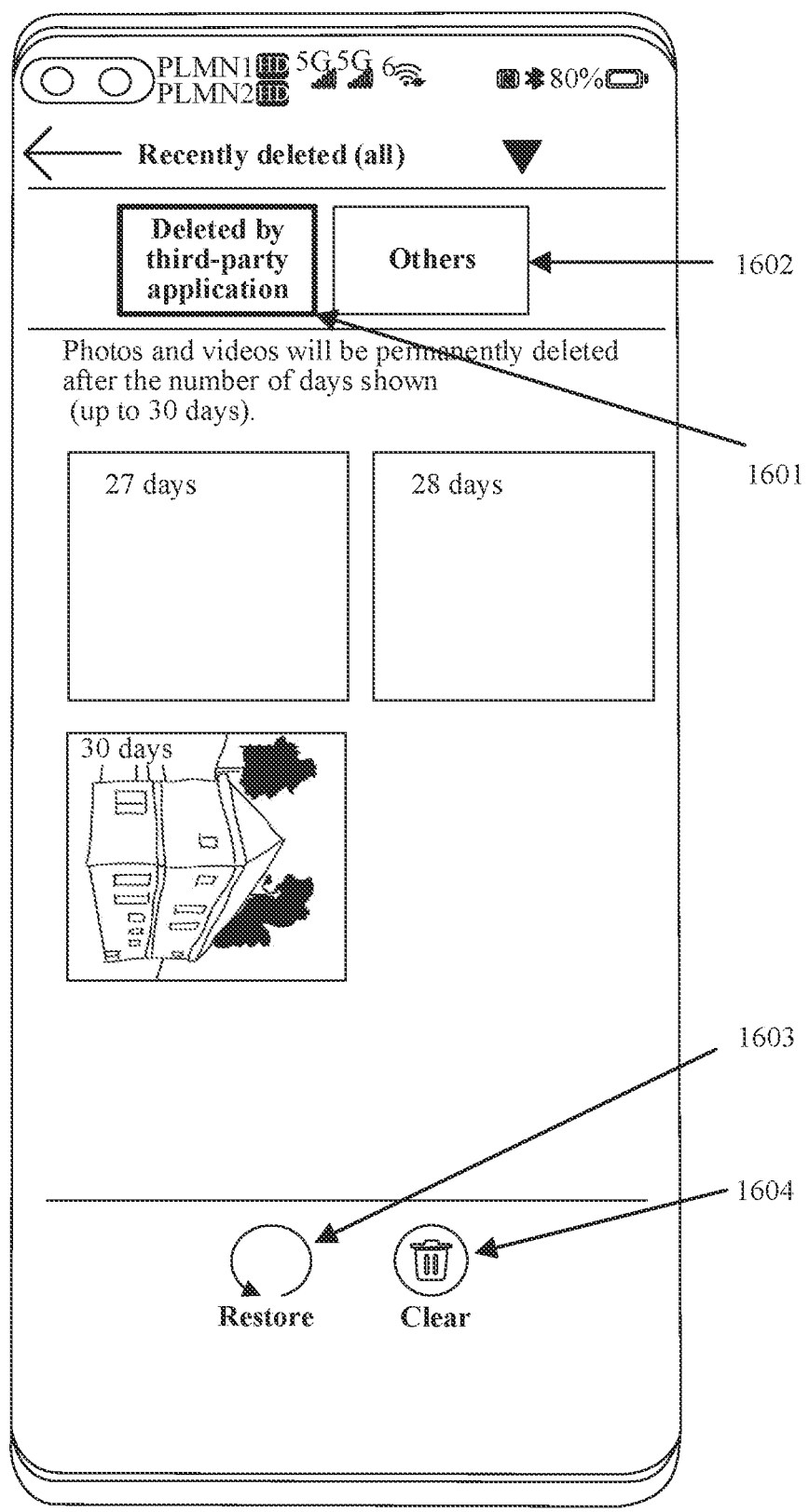
FIG. 16 is a schematic diagram of a browsing interface of another Recently Deleted album according to an embodiment of this application.

As another example, referring to FIG. 16, the electronic device 100, after opening the Recently Deleted album, may alternatively display a browsing interface as shown in FIG. 16. In the browsing interface shown in FIG. 16, the images deleted by the third-party applications and the images deleted by the system applications are distinguished by different pages, and the user may switch between the different pages by tapping the corresponding tabs.

Taking FIG. 16 as an example, after the user selects a "Deleted by third-party application" tab 1601, the electronic device 100 displays a page to which the images deleted by the third-party applications as shown in FIG. 16 belong, and thumbnails of the images deleted by the third-party applications are disposed on the page. If the user selects an "Others" tab 1602, the electronic device 100 displays a page to which the images deleted by the system applications belong, and thumbnails of the images deleted by the system applications are displayed on the page.

In addition to the above manner of distinguishing pages, the Recently Deleted album may alternatively be divided into two pages: "All" and "Deleted by third-party application". On the "All" page, the electronic device 100 displays the thumbnails of all the deleted images together. On the "Deleted by third-party application" page, the electronic device 100 displays the thumbnails of all the images deleted by the third-party applications. Similar to FIG. 16, the user may switch between the two pages by tapping the tabs corresponding to the "All" and "Deleted by third-party application" pages.

Similar to FIG. 15(1) and FIG. 15(2), on the page corresponding to the third-party applications shown in FIG. 16, the user may also tap a "Restore" button 1603 to restore all the images deleted by the third-party applications. Further, the user can also tap a "clear" button 1604. After the "clear" button is tapped, the electronic device 100 may completely delete the images deleted by the third-party applications retained in the Recently Deleted album.

This embodiment has the following beneficial effects. The images deleted by the third-party applications and the system applications are displayed in partitions, which is convenient for the user to quickly find the images deleted by the third-party applications, helps to view and restore, in a timely manner, the images deleted by the third-party applications, and improves usage experience of the user.

In some optional embodiments, the electronic device 100 may further display, in partitions, the images deleted by different third-party applications on the browsing interface of the Recently Deleted album.

Figure 17:
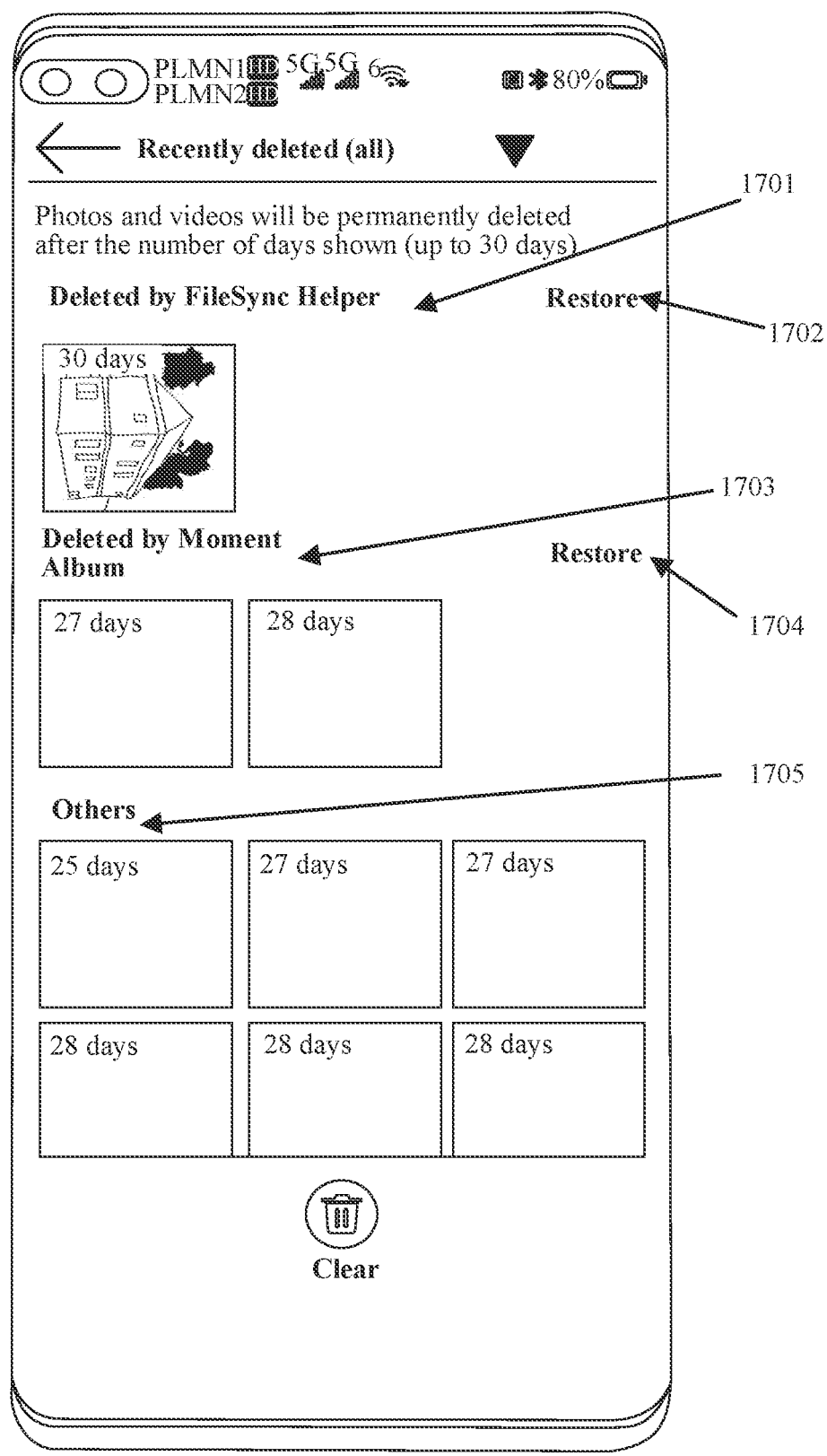
FIG. 17 is a schematic diagram of a browsing interface of yet another Recently Deleted album according to an embodiment of this application.

Referring to FIG. 17, assuming that images in the Recently Deleted album are deleted by the "FileSync Helper" and the "Moment Album", when the user taps the Recently Deleted album 1501 shown in FIG. 15(1), the electronic device 100 may display a browsing interface of the Recently Deleted album as shown in FIG. 17. As can be seen, in the Recently Deleted album, the electronic device 100 displays three titles respectively, namely "Deleted by FileSync Helper" 1701, "Deleted by Moment Album" 1703, and "Others" 1705. A region below the "Deleted by FileSync Helper" is used for displaying thumbnails of images deleted by the "FileSync Helper", a region below the "Deleted by Moment Album" is used for displaying thumbnails of images deleted by the "Moment Album", and a region below the "Others" is used for displaying thumbnails of the images deleted by the system applications.

Further optionally, each application corresponds to a "Restore" button. For example, in FIG. 17, the "Deleted by Moment Album" corresponds to a "Restore" button 1702, and the "Deleted by Moment Album" corresponds to a Restore button 1704. After the user taps the Restore button corresponding to any application, the electronic device 100 restores all images deleted by the application, and images deleted by applications other than the application may be continuously retained in the Recently Deleted album.

For example, in FIG. 17, the user may tap the "Restore" button 1702, then the electronic device 100 restores the images deleted by the "FileSync Helper", and other images in the Recently Deleted album are continuously retained.

On the browsing interface of the Recently Deleted album, the user may tap the thumbnail of any image. After a thumbnail of an image is tapped, the electronic device 100 opens a full-size image interface of the tapped image, and displays the tapped image and related information of the image on the full-size image interface. The related information may include deletion information and shooting information of the tapped image.

Figure 18:
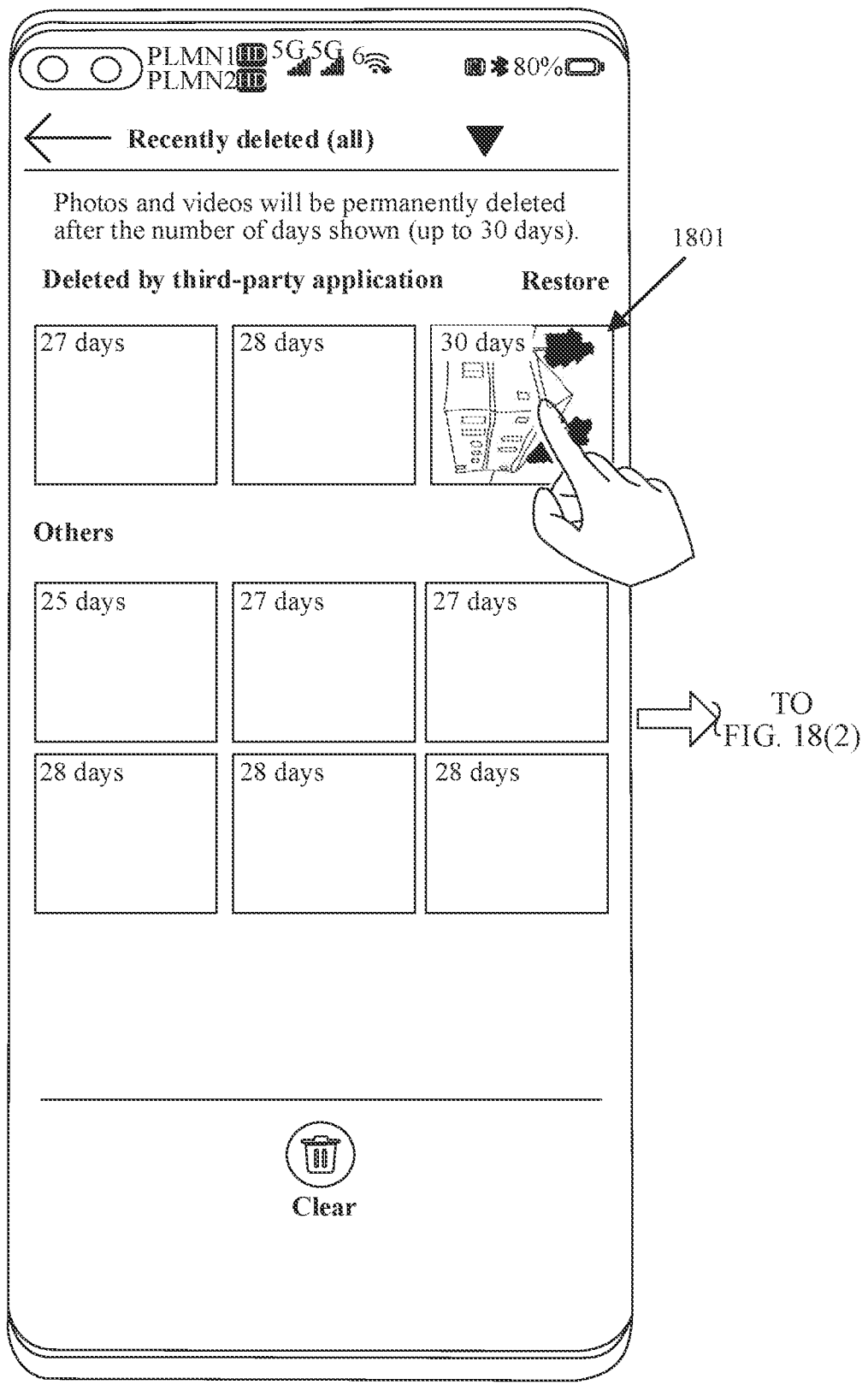
FIG. 18(1) and FIG. 18(2) are a schematic diagram of a full-size image interface of a Recently Deleted album according to an embodiment of this application.
Figure 18:
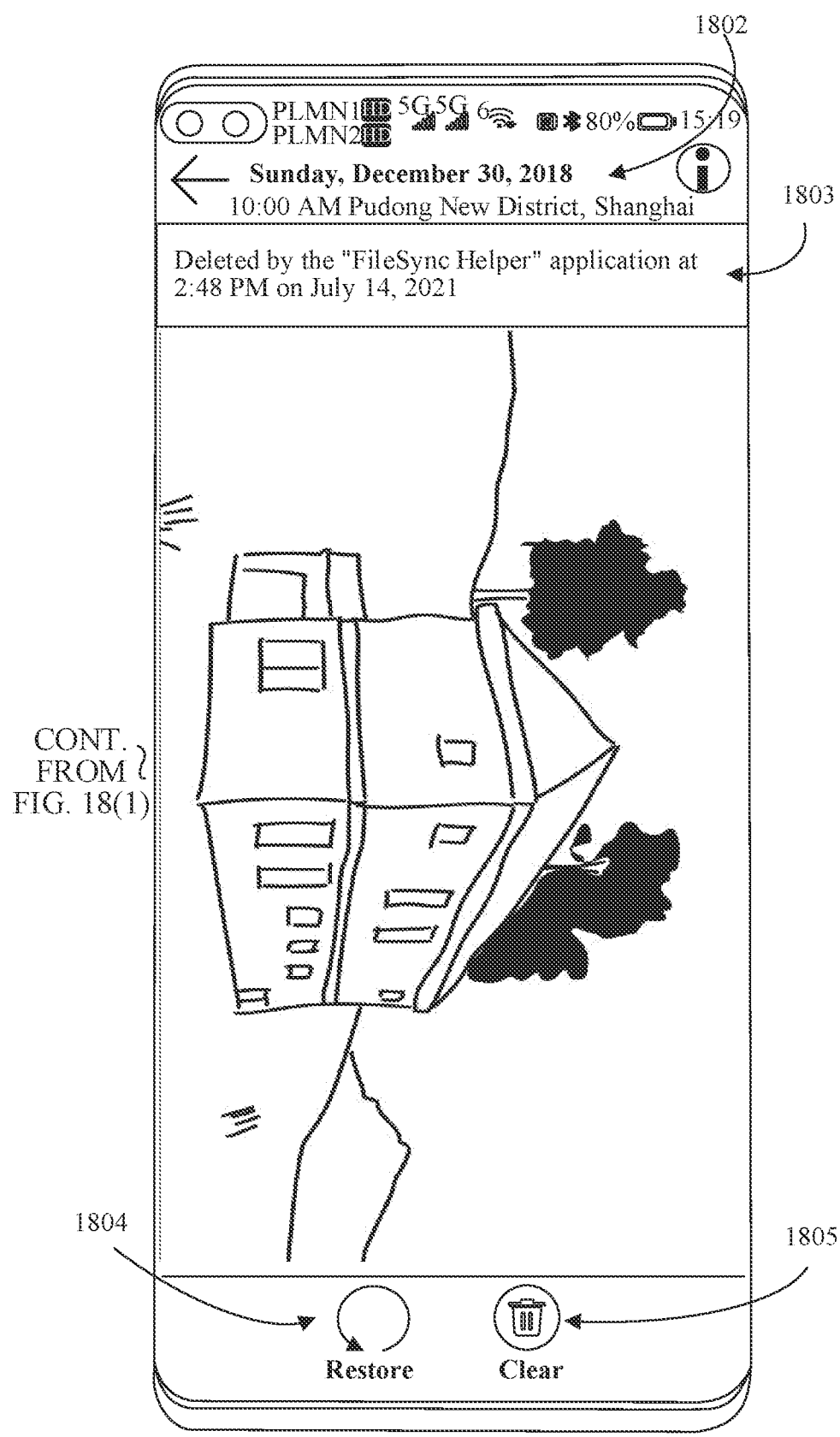

As an example, referring to FIG. 18(1) and FIG. 18(2), after the electronic device 100 opens a browsing interface of the Recently Deleted album shown in FIG. 18(1), the user taps a thumbnail 1801 of an image deleted by a third-party application on the interface. Then, the electronic device 100 opens, in response to an operation of the user, a full-size image interface of the image deleted by the third-party application shown in FIG. 18(2), and displays a complete image corresponding to the thumbnail 1801 on the full-size image interface.

As shown in FIG. 18(2), a title bar 1802 at the top of the full-size image interface is used for displaying shooting information of a currently displayed image, specifically including a shooting time and a shooting location of the currently displayed image. Taking FIG. 18(2) as an example, the shooting time of the displayed image was 10:00 AM on Dec. 30, 2018, and the shooting location is Pudong New District, Shanghai.

Deletion information of the current image is displayed in a banner 1803 below the title bar, specifically including a time when the image was deleted and an application deleting the image. Taking FIG. 18(2) as an example, the current image was deleted by the "FileSync Helper" at 2:48 PM on Jul. 14, 2021.

Optionally, when the user views any deleted image on the full-size image interface, the electronic device 100 may display the banner 1803 shown in FIG. 18(2), provided that information therein is adjusted according to different images.

For example, if the user views an image deleted by the gallery application at 2:00 PM on Jul. 14, 2021 on the full-size image interface, the electronic device 100 sets time information in the banner to 2:00 PM on Jul. 14, 2021 and sets the name of the application to "Gallery". If the viewed image is deleted by a cloud synchronization application, the electronic device 100 sets the name of the application to "cloud synchronization".

Still referring to FIG. 18(2), the electronic device 100 displays a "Restore" button 1804 and a "Clear" button 1805 on the full-size image interface. When the "Restore" button on the full-size image interface is tapped, the electronic device 100 restores the currently displayed image, and when the "Clear" button on the full-size image interface is tapped, the electronic device 100 completely deletes the currently displayed image.

Optionally, if the user restores or completely deletes an image on the full-size image interface, the electronic device 100 can remain on the full-size image interface and display an image following the restored or completely deleted image, or return to the browsing interface of the Recently Deleted album shown in FIG. 15(2).

In some optional embodiments, only the deletion information of the image but not the shooting information of the image may be displayed on the full-size image interface.

Figure 19:
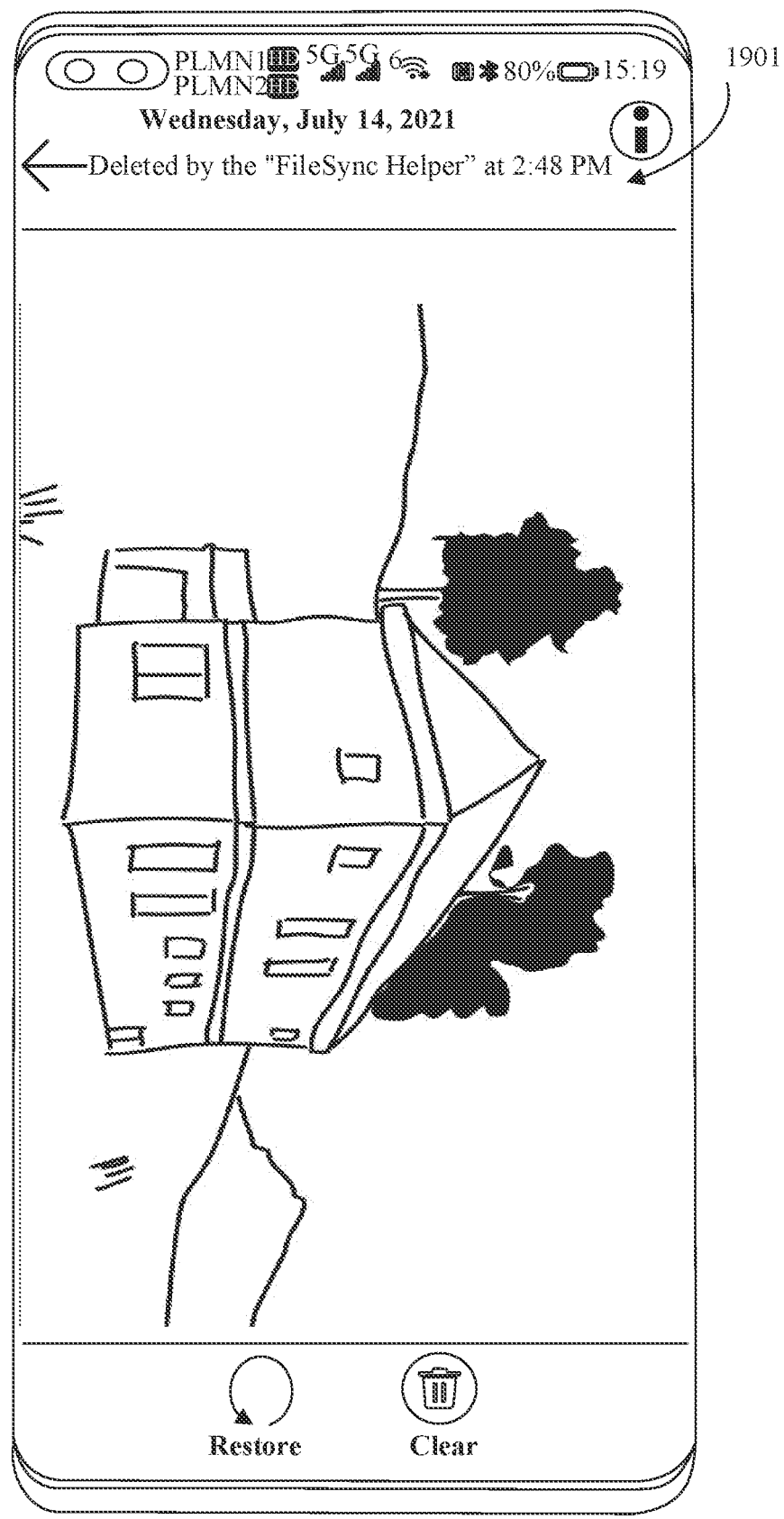
FIG. 19 is a schematic diagram of a full-size image interface of another Recently Deleted album according to an embodiment of this application.

Referring to FIG. 19, the electronic device 100, when opening the full-size image interface, may directly display the deletion information of the currently viewed image in a title bar 1901 at the top. Specifically, a time when the image was deleted and the name of the application deleting the image may be displayed. For example, in FIG. 19, according to the deletion information in the title bar 1901, it may be seen that the currently displayed image was deleted by the "FileSync Helper" application at 2:48 PM on Jul. 14, 2021.

In some optional embodiments, the electronic device 100 may simultaneously display the shooting information and the deletion information of the current image in the title bar of the full-size image interface. For example, the deletion information of the image may be displayed on a first line of the title bar, and the shooting information of the image may be displayed on a second line of the title bar.

If text of the deletion information is too long, the text may be displayed on a new line. That is, the deletion information is displayed on the first and second lines, and the shooting information is displayed on a third line below the deletion information.

The display of the deletion information in the title bar has the following advantages:

The title bar highly concerned in the interface is reused to display the deletion information that the user cares about, so that the user can quickly confirm deletion information of a currently displayed image after opening the full-size image interface.

The image deletion operation notification method provided in any embodiment of this application may be implemented by a software system of the electronic device 100. The software system of the electronic device 100 may use a layered architecture or another architecture. The software system of the electronic device 100 is described below by taking the layered architecture as an example.

Figure 20:
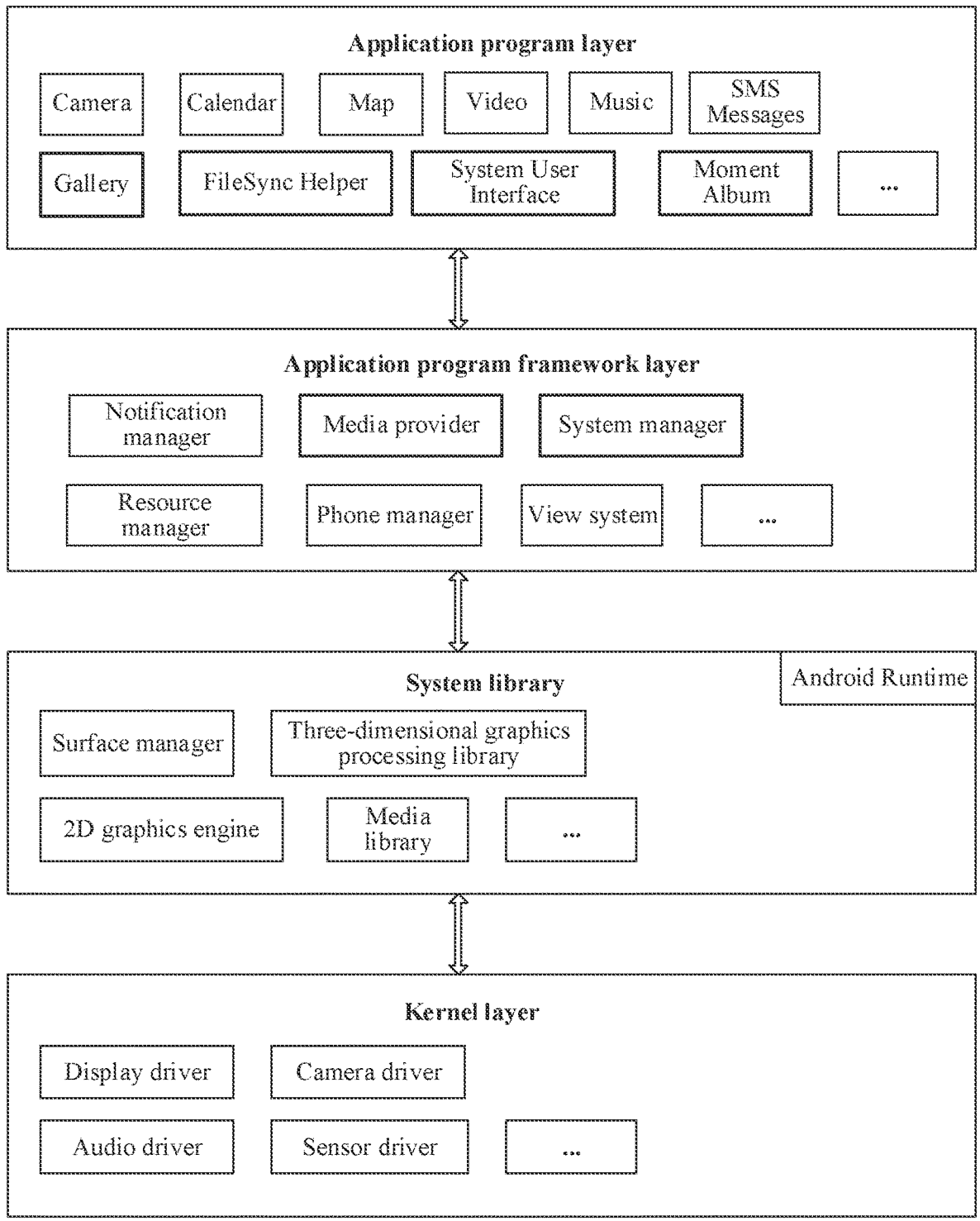
FIG. 20 is a schematic architectural diagram of a software system of an electronic device according to an embodiment of this application.

Refer to FIG. 20 which is a schematic architectural diagram of a software system of the electronic device 100 according to an embodiment of this application. In a layered architecture, the software system is divided into several layers, and each layer has a clear role and task. The layers communicate with each other through a software interface. In some embodiments, the Android system is divided into four layers, which are an application program layer, an application program framework layer, an Android runtime and system library, and a kernel layer from top to bottom.

The application program layer may include a series of application program packages. As shown in FIG. 20, the application program packages may include Camera, Calendar, Map, Video, Music, SMS Messages, Gallery, FileSync Helper, System User Interface (SystemUI), Moment Album, and the like.

One part of application programs, such as Gallery, SMS messages, and Camera, are pre-installed when the electronic device 100 leaves the factory. These application programs may be called system applications. The other part of application programs, such as FileSync Helper and Moment Album, are applications installed from the AppGallery or other channels as required when the user uses the electronic device 100. These application programs may be called third-party applications.

The application program framework layer provides an application programming interface (API) and a programming framework for application programs at the application program layer. The application program framework layer includes some predefined functions. As shown in FIG. 20, the application program framework layer may include a notification manager, a media provider, a system manager, a resource manager, a phone manager, a view system, and the like.

The media provider is configured to store and acquire multimedia data of the electronic device 100, and make the multimedia data accessible to an application program. The multimedia data may include images, videos, audios, and the like.

The view system includes visual controls such as a control for displaying a text and a control for displaying a picture. The view system may be configured to construct an application program. A display interface may include one or more views. For example, a display interface including a short message notification icon may include a view for displaying a text and a view for displaying a picture.

The phone manager is configured to provide a communication function for the electronic device 102, for example, call status management (including connected, hang-up, and the like).

The resource manager provides various resources such as a localized character string, an icon, a picture, a layout file, and a video file for an application program.

The notification manager enables the application program to display notification information in the status bar that may be used to convey a message of a notification type, where the message may disappear automatically after a short stay without user interaction. For example, the notification manager is configured to provide a notification of download completion, a message reminder, and the like. The notification manager may alternatively be a notification that appears on a top status bar of the system in the form of a graph or a scroll bar text, for example, a notification of an application program running on the background, or may be a notification that appears on the screen in the form of a dialog window. For example, text information is prompted on a status bar, a prompt tone is made, the electronic device vibrates, an indicator light flashes, or the like.

The phone manager is configured to provide an interface for accessing configuration information of the electronic device 100.

In this embodiment, the media provider is configured to detect whether an application program deletes an image of the electronic device 100 and configured to store the application whitelist in the foregoing embodiment.

The system manager is configured to update the application whitelist in the media provider. Specifically, the system manager may update the application whitelist according to application whitelist update information pushed by the cloud, or according to an operation performed by the user on the electronic device 100.

For example, the system manager may add "FileSync Helper" to the application whitelist after the user taps the "No more prompt for this application" button in the image deletion banner corresponding to the "FileSync Helper".

The Android Runtime includes a core library and a virtual machine. The Android runtime is responsible for scheduling and managing the Android system.

The core library includes two parts: one part is a performance function that the Java language needs to invoke, and the other part is a core library of Android.

The application program layer and the application program framework layer are run in the virtual machine. The virtual machine executes Java files of the application program layer and the application program framework layer as binary files. The virtual machine is used to execute functions such as object lifecycle management, stack management, thread management, security and exception management, and garbage collection.

The system library may include a plurality of function modules, for example, a surface manager, a media library (Media Libraries), a three-dimensional graphics processing library (e.g., OpenGL ES), a 2D graphics engine (e.g., SGL), and the like.

The surface manager is configured to manage a display subsystem, and provide fusion of 2D and 3D layers for a plurality of application programs.

The media library supports play back and recording in a plurality of common audio and video formats, static image files, and the like. The media library may support a plurality of audio and video coding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to the software system shown in FIG. 20, the image deletion operation notification method provided in the embodiments of this application may be implemented in the following manner:

When any application deletes an image stored on the electronic device 100, the media provider detects a behavior indicating that the application deletes the image, and then the media provider sends a deletion notification to the SystemUI and the gallery application. The notification carries a name of the application deleting the image and a time when the image was deleted.

Optionally, if the media provider stores an application whitelist, the media provider, after detecting that an application has deleted an image, determines whether the application belongs to the application whitelist. If the application belongs to the application whitelist, the media provider does not send any deletion notification to the SystemUI and the gallery application, and the corresponding electronic device 100 may not display the name of the application in the image deletion banner and the image deletion card. If the application does not belong to the application whitelist, the media provider sends a deletion notification to the SystemUI and the gallery application.

After receiving the deletion notification, the SystemUI displays the image deletion banner described in Embodiment 1 at the top of the display screen of the electronic device 100 and in the message notification bar, including information such as a name of the application deleting the image and a time when the image was deleted.

After the gallery application receives the deletion notification, the gallery application may retain the deleted image in the Recently Deleted album, and at the same time, the gallery application records the name of the application deleting the image and the time when the image was deleted in the deletion notification.

Afterwards, when the user opens the gallery application, the gallery application displays the image deletion card as shown in Embodiment 2, and displays the name of the application deleting the image in the image deletion card.

Further, when the user opens the Recently Deleted album, the gallery application displays a thumbnail of the deleted image through the browsing interface shown in Embodiment 3. After the user opens the full-size image interface, as described in Embodiment 3, the gallery application may display, in the title bar of the full-size image interface or at a banner below the title bar, the previously recorded information such as the name of the application deleting the image and the time when the image was deleted.

The above implementation is merely a specific example of an implementation of the image deletion operation notification method provided in this embodiment. In another optional embodiment, the electronic device 100 may alternatively implement the image deletion operation notification method provided in this application in another implementation, which is not limited in this application.

Figure 21:
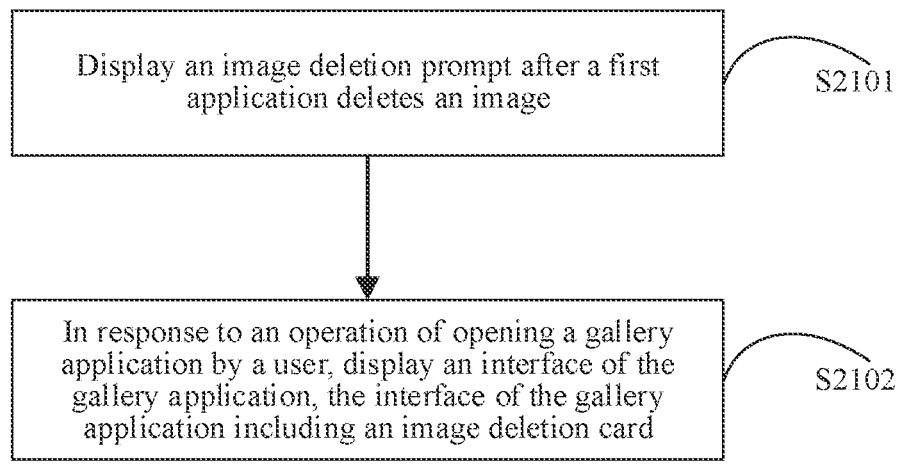
FIG. 21 is a flowchart of an image deletion operation notification method according to an embodiment of this application.

According to Embodiment 1 to Embodiment 3 above, an image deletion operation notification method may be obtained. Referring to a flowchart shown in FIG. 21, the image deletion operation notification method provided in this embodiment may include the following steps:

S2101: Display an image deletion prompt after a first application deletes an image.

The first application is a third-party application installed on the electronic device 100. Exemplarily, the first application may be the "FileSync Helper" described in the foregoing embodiment.

The image deletion prompt includes at least a name of the application deleting the image.

The specific form of the image deletion prompt is not limited in this embodiment. In some optional embodiments, the image deletion prompt may be an image deletion banner at the top of the display screen or in the message notification bar.

For a style and a specific implementation of the image deletion banner, reference may be made to the related content in Embodiment 1, and details are not described herein again.

S2102: In response to an operation of opening a gallery application by a user, display an interface of the gallery application, the interface of the gallery application including an image deletion card.

The above operation of opening a gallery application may be an operation of tapping an icon of the gallery application on the desktop by the user.

Referring to Embodiment 2, the image deletion card may include the name of the application deleting the image.

For a style and a specific implementation of the image deletion card, reference may be made to the related content in Embodiment 2, and details are not described herein again.

Further optionally, the electronic device 100 may display a deleted image viewing interface in response to an operation of tapping the image deletion prompt by the user.

Referring to Embodiment 3, the deleted image viewing interface may be the browsing interface of the Recently Deleted album as shown in FIG. 15(2). A thumbnail of the deleted image is displayed on the interface. The deleted image viewing interface may alternatively be a full-size image interface of a deleted image shown in FIG. 18(2). A deleted image and deletion information and/or shooting information of the deleted image are displayed on the interface.

In this embodiment, the electronic device 100 displays an image deletion prompt in time after finding that an image is deleted by an application, which helps the user know, in a timely manner, an image deletion operation performed by the application and view or restore the deleted image, achieving an effect of preventing loss of the image without user confirmation and improving usage experience of the user.

An embodiment of this application provides an electronic device, including a memory and one or more processors.

The memory is configured to store a computer program.

The one or more processors are configured to execute the computer program and specifically configured to implement the image deletion operation notification method provided in any embodiment of this application.

An embodiment of this application further provides a computer storage medium, configured to store a computer program, and specifically configured to implement the image deletion operation notification method provided in any embodiment of this application when the computer program is executed.

Reference to "one embodiment" or "some embodiments" described in this specification means that a specific characteristic, structure or feature described in combination with this embodiment is included in one or more embodiments of this application. Therefore, the statements "in one embodiment", "in some embodiments", "in some other embodiments", "in other embodiments", and the like in the differences in this specification do not necessarily refer to the same embodiment, but mean "one or more but not all embodiments", unless otherwise specially emphasized in other manners. The terms "include", "contain", "have" and their variations mean "including but not limited to", unless otherwise specially emphasized in other manners.

A plurality of involved in the embodiments of this application refers to two or more. It should be noted that in descriptions of the embodiments of this application, terms such as "first" and "second" are merely used for distinguishing descriptions, and cannot be understood as an indication or implication of relative importance, or an indication or implication of a sequence.

What is claimed is:

1. An image deletion operation notification method, comprising:
    displaying an image deletion prompt after detecting that a first application deletes an image, wherein the image deletion prompt comprises a name of the first application, the image deletion prompt is an image deletion banner corresponding to the first application, and the first application is a third-party application;
    displaying a first interface of a gallery application in response to an operation of opening the gallery application by a user, wherein the first interface comprises an image deletion card, the image deletion card comprises the name of the first application, and the first interface is not a full-size image interface for displaying an original image;
    displaying a preview interface of a first album in the gallery application in response to an operation of tapping the image deletion banner by the user, wherein the preview interface of the first album comprises a first partition and a second partition, the first partition comprises a first restore button and thumbnails of images deleted by third-party applications in the gallery application, and the second partition comprises thumbnails of images deleted by system applications in the gallery application;
    restoring the images corresponding to the thumbnails displayed in the first partition in response to an operation of tapping the first restore button by the user; and
    displaying a full-size image interface in response to an operation of tapping a thumbnail of a deleted image by the user, wherein the full-size image interface comprises an original image and deletion information of the deleted image, wherein the deletion information comprises a time at which the deleted image was deleted and a name of an application deleting the deleted image.

2. The notification method according to claim 1,
    wherein the image deletion banner comprises a timestamp and an unprompt button, the timestamp indicating a time at which the first application deleted the image; and
    wherein the notification method further comprises:
        removing the image deletion banner corresponding to the first application in response to an operation of tapping the unprompt button by the user;
        adding the first application to an application whitelist; and
        not displaying the image deletion banner corresponding to the first application after detecting that the first application deletes another image.

3. The notification method according to claim 1,
wherein the image deletion prompt comprises a notification message in a message notification bar of an electronic device; and
wherein after the detecting that the first application deletes the image, the method further comprises:
updating, in the notification message, a timestamp at which the first application deleted the image to a time when the first application deletes another image after detecting that the first application deletes the another image.

4. The notification method according to claim 1, further comprising:
displaying a second interface of the gallery application, the second interface comprising the image deletion card, and the second interface being different from the first interface.

5. The notification method according to claim 1, wherein after the displaying the first interface of the gallery application, the notification method further comprises:
displaying, in response to an upward swiping operation of the user, the first interface after upward swiping, wherein the first interface after upward swiping comprises the image deletion card; or
displaying, in response to an upward swiping operation of the user, the first interface after upward swiping, wherein the first interface after upward swiping does not comprise the image deletion card.

6. The notification method according to claim 1, wherein after the displaying the image deletion prompt after detecting that the first application deletes the image, the notification method further comprises:
adding a name of a second application to the image deletion card after detecting that the second application deletes an image.

7. The notification method according to claim 6, further comprising:
removing the name of the first application from the image deletion card based on the first application being added to the application whitelist.

8. The notification method according to claim 1,
wherein the first partition comprises at least one sub-partition, wherein each sub-partition of the at least one sub-partition corresponds to one third-party application; and
wherein each sub-partition of the at least one sub-partition is used for displaying thumbnails of images deleted by the corresponding third-party application.

9. The notification method according to claim 1,
wherein the deletion information is displayed in a title bar of the full-size image interface; or
wherein the deletion information is displayed below a title bar of the full-size image interface, wherein the title bar of the full-size image interface is used for displaying a shooting time and a shooting location of the deleted image.

10. An electronic device, comprising:
a processor; and
a memory, the memory being configured to store code instructions, and when the processor executes the code instructions, the electronic device performs actions comprising:
displaying an image deletion prompt after detecting that a first application deletes an image, wherein the image deletion prompt comprises a name of the first application, the image deletion prompt is an image deletion banner corresponding to the first application, and the first application is a third-party application;
displaying a first interface of a gallery application in response to an operation of opening the gallery application by a user, wherein the first interface comprises an image deletion card, the image deletion card comprises the name of the first application, and the first interface is not a full-size image interface for displaying an original image;
displaying a preview interface of a first album in the gallery application in response to an operation of tapping the image deletion banner by the user, wherein the preview interface of the first album comprises a first partition and a second partition, the first partition comprises a first restore button and thumbnails of images deleted by third-party applications in the gallery application, and the second partition comprises thumbnails of images deleted by system applications in the gallery application;
restoring the images corresponding to the thumbnails displayed in the first partition in response to an operation of tapping the first restore button by the user; and
displaying a full-size image interface in response to an operation of tapping a thumbnail of a deleted image by the user, wherein the full-size image interface comprises an original image and deletion information of the deleted image, wherein the deletion information comprises a time at which the deleted image was deleted and a name of an application deleting the deleted image.

11. The electronic device according to claim 10,
wherein the image deletion banner comprises a timestamp and an unprompt button, the timestamp indicating a time at which the first application deleted the image; and
wherein the actions further comprise:
removing the image deletion banner corresponding to the first application in response to an operation of tapping the unprompt button by the user;
adding the first application to an application whitelist; and
not displaying the image deletion banner corresponding to the first application after detecting that the first application deletes another image.

12. The electronic device according to claim 10,
wherein the image deletion prompt comprises a notification message in a message notification bar of an electronic device; and
after the detecting that the first application deletes the image, the actions further comprise:
updating, in the notification message, a timestamp at which the first application deleted the image to a time when the first application deletes another image after detecting that the first application deletes the another image.

13. The electronic device according to claim 10, wherein actions further comprise:
displaying a second interface of the gallery application, the second interface comprising the image deletion card, and the second interface being different from the first interface.

14. The electronic device according to claim 10, wherein after the displaying the first interface of the gallery application, the actions further comprise:
displaying, in response to an upward swiping operation of the user, the first interface after upward swiping, wherein the first interface after upward swiping comprises the image deletion card; or displaying, in response to an upward swiping operation of the user, the first interface after upward swiping, wherein the first interface after upward swiping does not comprise the image deletion card.

15. The electronic device according to claim 10, wherein after the displaying the image deletion prompt after detecting that the first application deletes the image, the actions further comprise:

adding a name of a second application to the image deletion card after detecting that the second application deletes an image.

16. The electronic device according to claim 15, wherein the actions further comprise:

removing the name of the first application from the image deletion card based on the first application being added to the application whitelist.

17. The electronic device according to claim 10, wherein the first partition comprises at least one sub-partition, wherein each sub-partition of the at least one sub-partition corresponds to one third-party application; and wherein each sub-partition of the at least one sub-partition is used for displaying thumbnails of images deleted by the corresponding third-party application.

18. The electronic device according to claim 10, wherein the deletion information is displayed in a title bar of the full-size image interface.

19. The electronic device according to claim 10, wherein the deletion information is displayed below a title bar of the full-size image interface, and the title bar of the full-size image interface is used for displaying a shooting time and a shooting location of the deleted image.

20. A non-transitory computer-readable storage medium, wherein the computer-readable storage medium stores instructions, and the instructions, when executed, cause an electronic device to perform actions comprising:

displaying an image deletion prompt after detecting that a first application deletes an image, wherein the image deletion prompt comprises a name of the first application, the image deletion prompt is an image deletion banner corresponding to the first application, and the first application is a third-party application;

displaying a first interface of a gallery application in response to an operation of opening the gallery application by a user, wherein the first interface comprises an image deletion card, the image deletion card comprises the name of the first application, and the first interface is not a full-size image interface for displaying an original image;

displaying a preview interface of a first album in the gallery application in response to an operation of tapping the image deletion banner by the user, wherein the preview interface of the first album comprises a first partition and a second partition, the first partition comprises a first restore button and thumbnails of images deleted by third-party applications in the gallery application, and the second partition comprises thumbnails of images deleted by system applications in the gallery application;

restoring the images corresponding to the thumbnails displayed in the first partition in response to an operation of tapping the first restore button by the user; and displaying a full-size image interface in response to an operation of tapping a thumbnail of a deleted image by the user, wherein the full-size image interface comprises an original image and deletion information of the deleted image, wherein the deletion information comprises a time at which the deleted image was deleted and a name of an application deleting the deleted image.

* * * * *